US00RE49690E

(19) United States
(12) Reissued Patent
Nakamura

(10) Patent Number: US RE49,690 E
(45) Date of Reissued Patent: Oct. 10, 2023

(54) TOUCH SCREEN WITH ELECTRODES INCLUDING LINEAR AND BRANCHED PORTIONS

(71) Applicant: Trivale Technologies, Santa Clara, CA (US)

(72) Inventor: Tatsuya Nakamura, Tokyo (JP)

(73) Assignee: Trivale Technologies, Santa Clara, CA (US)

(21) Appl. No.: 17/411,657

(22) Filed: Aug. 25, 2021

Related U.S. Patent Documents

Reissue of:
(64) Patent No.: 10,394,403
Issued: Aug. 27, 2019
Appl. No.: 15/790,325
Filed: Oct. 23, 2017

(30) Foreign Application Priority Data

Oct. 31, 2016 (JP) ..... 2016-212553

(51) Int. Cl.
*G06F 3/044* (2006.01)
*G06F 3/041* (2006.01)
*G02F 1/1333* (2006.01)

(52) U.S. Cl.
CPC ..... *G06F 3/0446* (2019.05); *G06F 3/0445* (2019.05); *G06F 3/0448* (2019.05); *G06F 3/04164* (2019.05); *G02F 1/13338* (2013.01); *G02F 2202/28* (2013.01); *G06F 2203/04112* (2013.01)

(58) Field of Classification Search
CPC .. G06F 3/0446; G06F 3/04164; G06F 3/0445; G06F 3/0448; G06F 2203/04112; G02F 1/13338; G02F 2202/28
See application file for complete search history.

(56) References Cited

U.S. PATENT DOCUMENTS 5,844,506 A * 12/1998 Binstead ..... G06F 3/0202 341/34
6,452,514 B1 * 9/2002 Philipp ..... G01D 5/2405 178/18.06

(Continued)

FOREIGN PATENT DOCUMENTS

JP H09-511086 A 11/1997
JP 2003-526831 A 9/2003

(Continued)

*Primary Examiner* — Christina Y. Leung
(74) *Attorney, Agent, or Firm* — Studebaker & Brackett PC

(57) ABSTRACT

In a touch screen, a lower electrode is insulated from an upper electrode by an insulation film. A column direction wire of the upper electrode includes a first linear portion which extends in a row direction, and first branch portions which are branched from the first linear portion. A row direction wire of the lower electrode includes a second linear portion which extends in a column direction, and second branch portions which are branched from the second linear portion. The second linear portion three-dimensionally intersects the first linear portion, yet does not three-dimensionally intersect first branch portions. A rim portion of each of second branch portions includes a portion parallel along an outline of the first linear portion or first branch portions, yet does not include a portion parallel along an outline of the second linear portion. At each of second branch portions, a cavity portion is formed.

20 Claims, 13 Drawing Sheets

(56) References Cited

U.S. PATENT DOCUMENTS

| | | | | |
|---|---|---|---|---|
| RE40,867 | E | 8/2009 | Binstead | |
| 8,269,744 | B2 * | 9/2012 | Agari | G06F 3/044 345/173 |
| 8,390,598 | B2 | 3/2013 | Agari et al. | |
| 8,593,410 | B2 * | 11/2013 | Hong | G06F 1/16 345/173 |
| 9,295,176 | B2 * | 3/2016 | Ohtani | G06F 3/041 |
| 2010/0214232 | A1 * | 8/2010 | Chan | G06F 3/04182 345/173 |
| 2013/0285980 | A1 * | 10/2013 | Oya | G06F 3/0445 345/174 |
| 2016/0139707 | A1 * | 5/2016 | Nakamura | G06F 3/044 345/174 |
| 2016/0313860 | A1 * | 10/2016 | Ono | G06F 3/0418 |
| 2016/0334933 | A1 * | 11/2016 | Ono | G06F 3/044 |
| 2016/0357285 | A1 * | 12/2016 | Ono | G06F 3/044 |

FOREIGN PATENT DOCUMENTS

| | | | |
|---|---|---|---|
| JP | 2010-061502 | A | 3/2010 |
| JP | 2010-198586 | A | 9/2010 |
| JP | 2012-103761 | A | 5/2012 |
| JP | 2014-186535 | A | 10/2014 |
| WO | 95/27334 | A1 | 10/1995 |
| WO | 00/044018 | A1 | 7/2000 |
| WO | 2012/096210 | A1 | 7/2012 |

* cited by examiner

TOUCH SCREEN WITH ELECTRODES INCLUDING LINEAR AND BRANCHED PORTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The present invention relates to a touch screen, a touch panel which includes the touch screen, a display device which includes the touch panel, and an electronic device which includes the touch panel.

Description of the Background Art

A touch panel is a device which detects a touch by a pointing body such as a finger and specifies a position coordinate indicating a touch position touched on the touch panel, and is gaining attention as a device which contributes to providing a good user interface. The touch panel which is currently provided as a product detects a touch by the pointing body based on a resistance film system or a capacitive system.

Generally speaking, the touch panel includes a touch screen and a detecting device. The detecting device specifies a position coordinate indicating a touch position based on a signal inputted from the touch screen. The touch screen includes a built-in touch sensor which detects a touch.

A touch panel of a capacitive system includes a touch panel of a projected capacitive system. A touch panel disclosed in Japanese Patent Application Laid-Open No. 2012-103761 is an example of such a touch panel. A touch panel of a projected capacitive system which is typified by the touch panel disclosed in Japanese Patent Application Laid-Open No. 2012-103761 can detect a touch by a pointing body even when a front surface of a touch screen including a built-in touch sensor is covered by a protection plate made of a glass plate having a thickness of several millimeters. Consequently, by disposing the protection plate on the front surface of the touch screen in the touch panel of the projected capacitive system, it is possible to provide good robustness to the touch panel. Further, even when there is a touch by a finger of a user's hand wearing a glove, the touch panel of the projected capacitive system can detect the touch. Furthermore, the touch panel of the projected capacitive system does not include a movable portion, and therefore has a long operational life.

The touch panel of the capacitive system typically includes a first electrode and a second electrode. The first electrode typically includes a plurality of row wires. The second electrode typically includes a plurality of column wires. Each of a plurality of row wires extends in a row direction. A plurality of row wires is aligned in a column direction. Each of a plurality of column wires extends in the column direction. A plurality of column wires is aligned in the row direction.

The touch panel of the capacitive system detects a change in a capacitance according to a detection system such as a self-capacitive system or a mutual capacitive system, and specifies a touch position based on the detected change in the capacitance.

When a change in a capacitance is detected by the self-capacitive system, a plurality of row wires and a plurality of column wires are detection wires for detecting a capacitance, a detection circuit detects the change in the capacitance between a pointing body and each of a plurality of row wires, and the detection circuit detects the change in the capacitance between the pointing body and each of a plurality of column wires to specify a touch position based on the detected change in the capacitance of the former and the detected change in the capacitance of the latter. A technique disclosed in Japanese Translation of PCT Application Publication No. 9-511086 is an example of such a technique. According to the technique disclosed in Japanese Translation of PCT Application Publication No. 9-511086, a plurality of row wires is included which is called a first series of conductor elements, and a plurality of column wires is included which is called a second series of conductor elements. The first series of conductor elements are adhered onto a surface of a thin dielectric film. The second series of conductor elements are adhered onto the surface of the thin dielectric film, and are insulated from the first series of conductor elements by an insulation film. The second series of conductor elements intersect the first series of conductor elements to form a plurality of intersection points. The capacitance of each of the first series of conductor elements is sampled by the detection circuit, and the capacitance of each of the second series of conductor elements is sampled by the detection circuit to determine a position of a pointing body which is called an interference object based on changes in the sampled capacitance of the former and the sampled capacitance of the latter.

When a change in the capacitance is detected by the mutual capacitive system, a change in an electric field, i.e., a change in a mutual capacitance between each of a plurality of row wires and a plurality of column wires is detected by the detection circuit to specify a touch position based on the detected change in the mutual capacitance. A technique disclosed in Japanese Translation of PCT Application Publication No. 2003-526831 is an example of such a technique.

Both of the self-capacitive system and the mutual capacitive system generally employ the following method for specifying a position coordinate. That is, a touch surface is partitioned into a plurality of planar areas in a lattice pattern such that each row includes one row wire and each column includes one column wire. Each of a plurality of planar areas is referred to as a detection cell. Further, when there is a touch by a pointing body, a position coordinate indicating a touch position is specified based on a balance between a detection value of a sensor block which is a touched detection cell, and a detection value of a detection cell near the sensor block.

Recently, a connection mode that a lead wire is connected only to one end of each of a plurality of row wires, and a lead wire is connected only to one end of each of a plurality of column wires is realized. This connection mode can be realized by forming detection wires by mesh electrodes made of metal having an electrical resistance lower than that of a transparent electrode made of indium tin oxide (ITO). A technique disclosed in Japanese Patent Application Laid-Open No. 2010-61502 is an example of such a technique.

In a touch panel adopting glass having a single-sided two-layer structure in which row wires and column wires are disposed on one main surface of a glass plate, a mutual capacitance is planarly produced between the row wires and the column wires, and capacitive coupling between the wires and a pointing body such as a finger is detected to specify a position coordinate. Further, in the touch panel adopting the glass having the single-sided two-layer structure, coupling between the row wires and the column wires is strong, and therefore it is difficult to produce a sufficient electric field at a position distant from the row wires and the column wires. In this case, when a distance from the row wires and the column wires to the pointing body is long, it is difficult to detect a change in the mutual capacitance and specify a position coordinate indicating a touch position. This problem also occurs when a plate including a main surface on which the row wires and the column wires are disposed is made of a material other than glass, when a first electrode includes wires adopting a structure which is hardly row wires, and when a second electrode includes wires adopting a structure which is hardly column wires.

Meanwhile, in recent years, diversification of usage of touch panels demands to adopt a thick protection plate compared to that of a conventional technique to provide the highly robust touch panels, and allow a finger of a hand wearing a thick glove such as a ski glove to give an instruction. Therefore, even when a distance from the first electrode and the second electrode to a pointing body is long, it is necessary to make it possible to detect a change in a mutual capacitance, and specify a position coordinate indicating a touch position.

SUMMARY OF THE INVENTION

An object of the present invention is to provide a touch screen which can detect a change in a mutual capacitance and specify a position coordinate indicating a touch position even when a distance from an electrode to a pointing body is long.

The present invention relates to a touch screen, a touch panel which includes the touch screen, a display device which includes the touch panel, and an electronic device which includes the touch panel.

The touch screen includes a first electrode, an insulation film and a second electrode. The first electrode, the insulation film and the second electrode are disposed on a main surface of a substrate. The second electrode is insulated from the first electrode by the insulation film.

The first electrode includes a plurality of first wires, and the second electrode includes a plurality of second wires. A plurality of first wires is detection wires. A plurality of second wires is excitation wires. It is allowable that a plurality of first wires is the excitation wires, and a plurality of second wires is the detection wires.

Each of a plurality of first wires includes a first linear portion and a plurality of first branch portions. The first linear portion extends in a first direction. A plurality of first branch portions is branched from the first linear portion.

Each of a plurality of second wires includes a second linear portion and a plurality of second branch portions. The second linear portion extends in a second direction which is not in parallel to the first direction. A plurality of second branch portions is branched from the second linear portion.

The second linear portion three-dimensionally intersects the first linear portion, yet does not three-dimensionally intersect a plurality of first branch portions.

Each of a plurality of second branch portions includes a rim portion. At each of a plurality of second branch portions, a cavity portion surrounded by the second linear portion and the rim portion is formed. When seen in a plan view in a direction vertical to the main surface of the substrate, the rim portion includes a portion parallel along an outline of the first linear portion or a plurality of first branch portions, yet does not include a portion parallel along an outline of the second linear portion.

A coupling capacitance between the excitation wires and the detection wires is low, and a coupling capacitance between a pointing body and the excitation wires and the detection wires is high. Further, a ground capacitance between the excitation wires or the detection wires, and a ground decreases. Consequently, even when a distance from the electrode to the pointing body is long, it is possible to detect a change in a mutual capacitance, and specify a position coordinate indicating a touched touch position.

These and other objects, features, aspects and advantages of the present invention will become more apparent from the following detailed description of the present invention when taken in conjunction with the accompanying drawings.

DESCRIPTION OF THE PREFERRED EMBODIMENTS

1 First Preferred Embodiment 1.1 Preface

The first preferred embodiment relates to a touch screen.

1.2 Stacked Structure of Touch Screen

Figure 1:
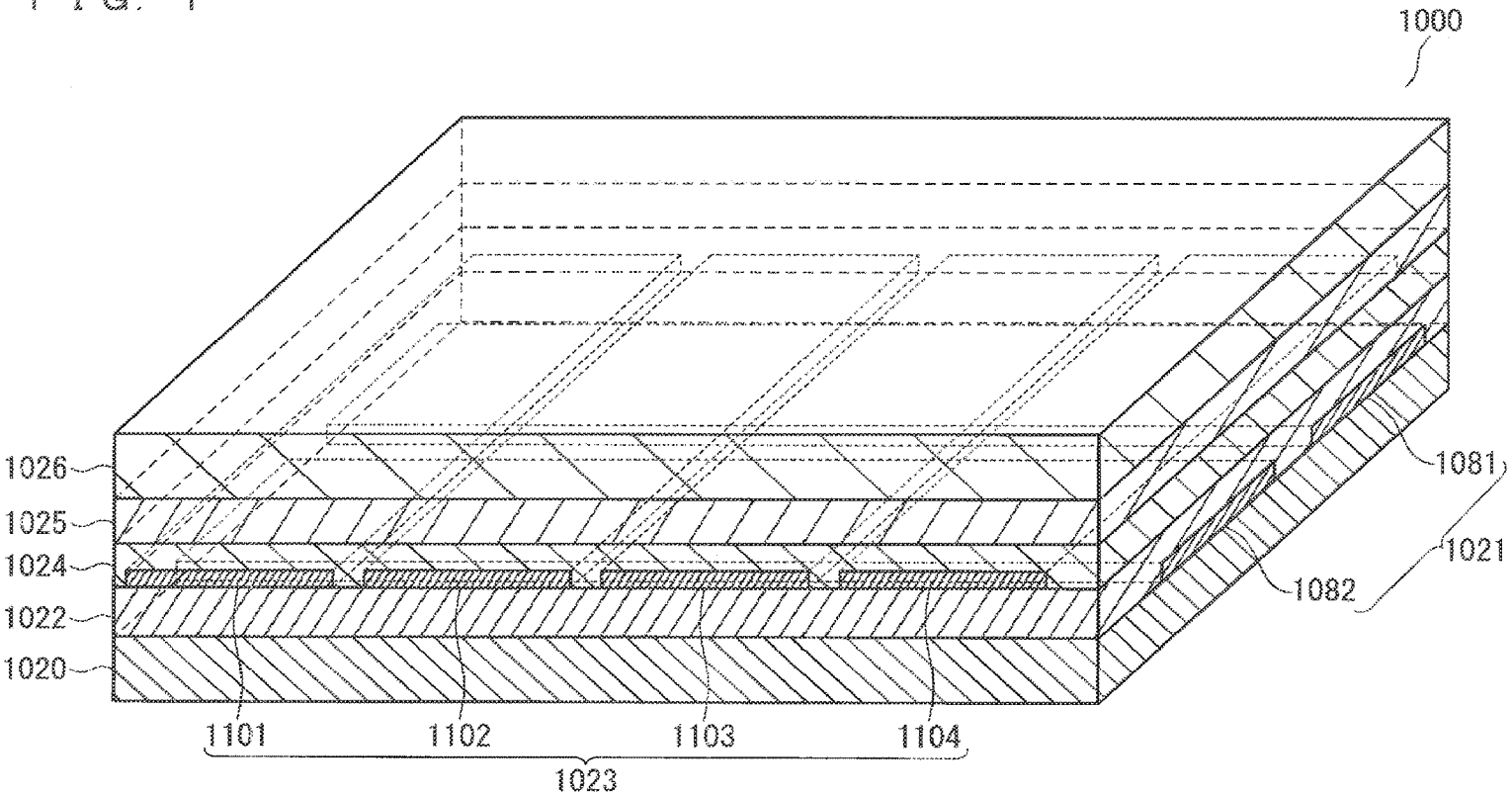
FIG. 1 is a perspective view illustrating a touch screen according to a first preferred embodiment.
Figure 2:
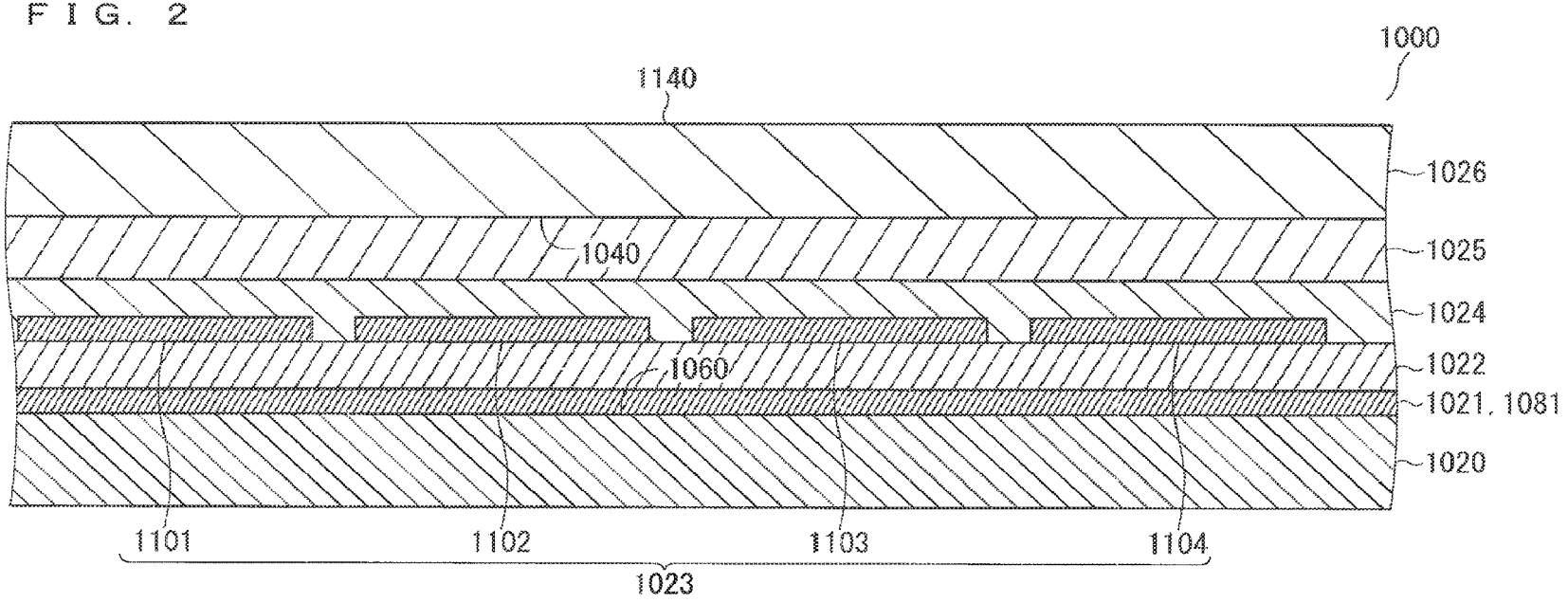
FIG. 2 is a cross-sectional view illustrating the touch screen according to the first preferred embodiment.
Figure 3:
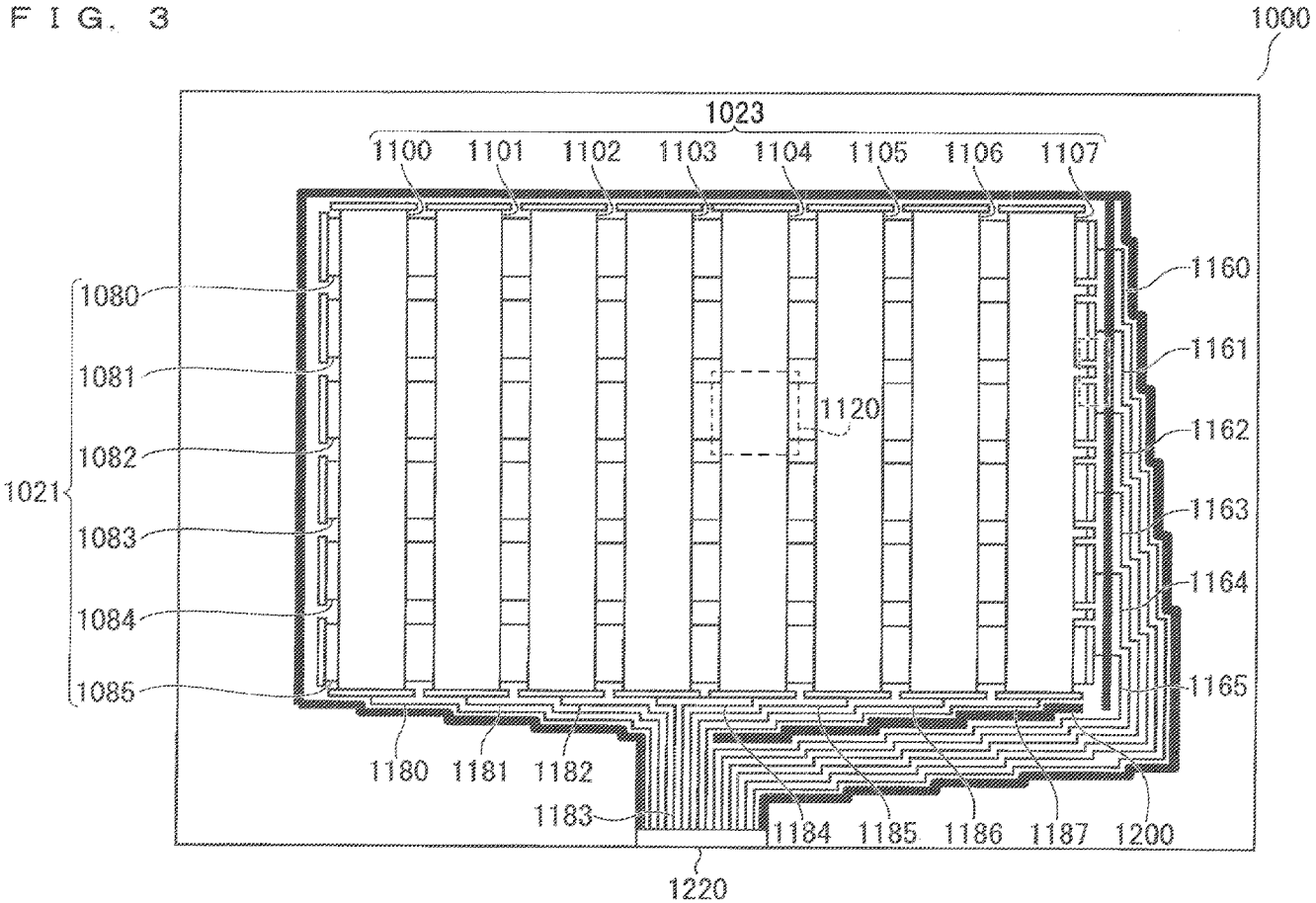
FIG. 3 is a plan view illustrating the touch screen according to the first preferred embodiment.

Schematic views of FIGS. 1, 2 and 3 are a perspective view, a cross-sectional view and a plan view illustrating the touch screen according to the first preferred embodiment respectively.

A touch screen 1000 illustrated in FIGS. 1, 2 and 3 is a device which detects a touch position touched by a pointing body such as a finger. The touch screen 1000 is configured to be able to detect a touch position according to a projected capacitive system.

As illustrated in FIGS. 1 and 2, the touch screen 1000 includes a transparent substrate 1020, a lower electrode 1021, an inter-layer insulation film 1022, an upper electrode 1023, a protection film 1024, a pressure sensitive adhesive layer 1025 and a transparent substrate 1026. The touch screen 1000 may include components other than these components.

One main surface 1040 of the transparent substrate 1026 is opposed to one main surface 1060 of the transparent substrate 1020 across the lower electrode 1021, the inter-layer insulation film 1022, the upper electrode 1023, the protection film 1024 and the pressure sensitive adhesive layer 1025. The lower electrode 1021 is disposed on the one main surface 1060 of the transparent substrate 1020. The inter-layer insulation film 1022 is overlaid on the lower electrode 1021 and is disposed on the one main surface 1060 of the transparent substrate 1020 to cover the entire lower electrode 1021. The upper electrode 1023 is overlaid on the lower electrode 1021 and the inter-layer insulation film 1022, and is disposed on the one main surface 1060 of the transparent substrate 1020. The protection film 1024 is overlaid on the lower electrode 1021, the inter-layer insulation film 1022 and the upper electrode 1023 and is disposed on the one main surface 1060 of the transparent substrate 1020 to cover the entire upper electrode 1023. The pressure sensitive adhesive layer 1025 is overlaid on the lower electrode 1021, the inter-layer insulation film 1022, the upper electrode 1023 and the protection film 1024, and is disposed on the one main surface 1060 of the transparent substrate 1020. By this means, the lower electrode 1021, the inter-layer insulation film 1022, the upper electrode 1023, the protection film 1024 and the pressure sensitive adhesive layer 1025 are held between the one main surface 1060 of the transparent substrate 1020 and the one main surface 1040 of the transparent substrate 1026, are supported by the transparent substrate 1020 disposed in the lowermost layer and are protected by the transparent substrate 1026 disposed in the uppermost layer. Further, the upper electrode 1023 is insulated from the lower electrode 1021 by the inter-layer insulation film 1022.

1.3 Arrangement of Lower Electrode and Upper Electrode

As illustrated in FIGS. 1, 2 and 3, the lower electrode 1021 includes row direction wires 1080, 1081, 1082, 1083, 1084 and 1085, and the upper electrode 1023 includes column direction wires 1100, 1101, 1102, 1103, 1104, 1105, 1106 and 1107. The six row direction wires 1080, 1081, 1082, 1083, 1084 and 1085 may be replaced with five or less row direction wires or seven or more row direction wires. The eight column direction wires 1100, 1101, 1102, 1103, 1104, 1105, 1106 and 1107 may be replaced with seven or less column row wires or nine or more column direction wires.

Each of the row direction wires 1080, 1081, 1082, 1083, 1084 and 1085 extends in a row direction. The row direction wires 1080, 1081, 1082, 1083, 1084 and 1085 are aligned in a column direction. Each of the column direction wires 1100, 1101, 1102, 1103, 1104, 1105, 1106 and 1107 extends in the column direction. The column direction wires 1100, 1101, 1102, 1103, 1104, 1105, 1106 and 1107 are aligned in the row direction. The row direction is a direction parallel to the one main surface 1060 of the transparent substrate 1020. The column direction is a direction parallel to the one main surface 1060 of the transparent substrate 1020 and vertical to the row direction.

The touch screen 1000 includes a detectable area in which a touch by the pointing body can be detected. The detectable area is a matrix area including a plurality of sensor units aligned in a matrix pattern. FIG. 3 illustrates a rectangle 1120 indicating one sensor unit of a plurality of sensor units. The row direction wires 1080, 1081, 1082, 1083, 1084 and 1085 and the column direction wires 1100, 1101, 1102, 1103, 1104, 1105, 1106 and 1107 are disposed in the detectable area. A plurality of sensor units is aligned such that one row direction wire is disposed in each row and one column direction wire is disposed in each column. Hence, an intersection point of one column direction wire and one row direction wire is disposed at each of a plurality of sensor units.

Each of the column direction wires 1100, 1101, 1102, 1103, 1104, 1105, 1106 and 1107 intersects each of the row direction wires 1080, 1081, 1082, 1083, 1084 and 1085 when seen in a plan view in a normal direction of the one main surface 1060 of the transparent substrate 1020, but is separated by the inter-layer insulation film 1022 from each of the row direction wires 1080, 1081, 1082, 1083, 1084 and 1085 in the normal direction of the one main surface 1060 of the transparent substrate 1020. Hence, each of the column direction wires 1100, 1101, 1102, 1103, 1104, 1105, 1106 and 1107 three-dimensionally intersects each of the row direction wires 1080, 1081, 1082, 1083, 1084 and 1085, is partitioned from each of the row direction wires 1080, 1081, 1082, 1083, 1084 and 1085 by the inter-layer insulation film 1022, and is insulated from each of the row direction wires 1080, 1081, 1082, 1083, 1084 and 1085 by the inter-layer insulation film 1022.

Each of the row direction wires 1080, 1081, 1082, 1083, 1084 and 1085 extending in the row direction may be replaced with a wire extending in a direction different from the row direction. Each of the column direction wires 1100, 1101, 1102, 1103, 1104, 1105, 1106 and 1107 extending in the column direction may be replaced with a wire extending in a direction different from the column direction. In this regard, the direction in which each wire of the latter extends is not parallel to a direction in which each wire of the former extends.

The lower electrode 1021 disposed in the lower layer and the upper electrode 1023 disposed in the upper layer may be replaced with one electrode and the other electrode disposed in an identical layer. In this case, the inter-layer insulation film 1022 which insulates the lower layer in which the lower electrode 1021 is disposed from the upper layer in which the upper electrode 1023 is disposed is replaced with an insulation film which covers only a portion of the one electrode which three-dimensionally intersects the other electrode.

1.4 Material

The transparent substrates 1020 and 1026 are made of a transparent glass material or a transparent resin material, and have light-transmissiveness. It is allowable that the transparent substrates 1020 and 1026 are made of another material. For example, it is also allowable that the transparent substrates 1020 and 1026 are made of a ceramic material or a single crystal material. When the touch screen 1000 is built in a touch pad and it is not necessary to allow light to transmit through the touch screen 1000, the transparent substrates 1020 and 1026 may be replaced with non-transparent substrates.

Each of the row direction wires 1080, 1081, 1082, 1083, 1084 and 1085 adopts a multilayer structure, and each of the column direction wires 1100, 1101, 1102, 1103, 1104, 1105, 1106 and 1107 adopts a multilayer structure. The multilayer structure includes an aluminum alloy layer and a nitride layer. The multilayer structure may include layers other than these layers. The aluminum alloy layer and the nitride layer are stacked. The aluminum alloy layer is made of aluminum alloy. The nitride layer is made of nitride of aluminum alloy. The multilayer structure lowers an electrical resistance of excitation wires and detection wires, and lowers a reflectance of light in the detectable area. The aluminum alloy layer may be replaced with a layer made of another conductive material, and the nitride layer may be replaced with a layer made of nitride made of the other conductive material. For example, the aluminum alloy layer may be replaced with a layer made of a metal wire material such as aluminum or copper or an alloy wire material such as copper alloy other than aluminum alloy.

Each of the row direction wires 1080, 1081, 1082, 1083, 1084 and 1085 may include a single layer structure, and each of the column direction wires 1100, 1101, 1102, 1103, 1104, 1105, 1106 and 1107 may include a single layer structure. The single layer structure is made of a transparent wire material such as indium tin oxide (ITO), a metal wire material such as aluminum or copper, or an alloy wire material such as aluminum alloy or copper alloy.

The inter-layer insulation film 1022 and the protection film 1024 are made of silicon nitride or silicon oxide, have light-transmissiveness and an insulation property, and are transparent insulation films. It is also allowable that the inter-layer insulation film 1022 and the protection film 1024 are made of another insulation material.

The pressure sensitive adhesive layer 1025 is made of a pressure sensitive adhesive. The pressure sensitive adhesive layer 1025 made of the pressure sensitive adhesive may be replaced with an adhesive layer made of an adhesive.

1.5 Mechanism for Specifying Touch Position

The row direction wires 1080, 1081, 1082, 1083, 1084 and 1085 are the excitation wires. The column direction wires 1100, 1101, 1102, 1103, 1104, 1105, 1106 and 1107 are the detection wires. It is also allowable that the row direction wires 1080, 1081, 1082, 1083, 1084 and 1085 are the detection wires, and the column direction wires 1100, 1101, 1102, 1103, 1104, 1105, 1106 and 1107 are the excitation wires.

When another main surface 1140 of the transparent substrate 1026 is touched by the pointing body, capacitance coupling, i.e., a touch capacitance is produced between the pointing body and the row direction wires 1080, 1081, 1082, 1083, 1084 or 1085 or the column direction wires 1100, 1101, 1102, 1103, 1104, 1105, 1106 or 1107. When the mutual capacitive system is employed, a change in the mutual capacitance between the row direction wires 1080, 1081, 1082, 1083, 1084 or 1085 and the column direction wires 1100, 1101, 1102, 1103, 1104, 1105, 1106 or 1107 caused by the production of the touch capacitance is detected, and which position of the detectable area is touched is specified.

1.6 Arrangement of Lead Wires, Dummy Lead Wire and Terminal

As illustrated in FIG. 3, the touch screen 1000 includes lead wires 1160, 1161, 1162, 1163, 1164 and 1165, lead wires 1180, 1181, 1182, 1183, 1184, 1185, 1186 and 1187, a dummy lead wire 1200 and a terminal 1220.

The row direction wires 1080, 1081, 1082, 1083, 1084 and 1085 are electrically connected to the terminal 1220 by the lead wires 1160, 1161, 1162, 1163, 1164 and 1165, respectively. The column direction wires 1100, 1101, 1102, 1103, 1104, 1105, 1106 and 1107 are electrically connected to the terminal 1220 by the lead wires 1180, 1181, 1182, 1183, 1184, 1185, 1186 and 1187, respectively. The terminal 1220 is electrically connected with external wires. The dummy lead wire 1200 is disposed between the lead wire 1165 and the lead wire 1187.

The lead wires 1160, 1161, 1162, 1163, 1164 and 1165 and the lead wires 1180, 1181, 1182, 1183, 1184, 1185, 1186 and 1187 are disposed close to each other at an outer rim portion of the detectable area. The shortest lead wire 1165 of the lead wires 1160, 1161, 1162, 1163, 1164 and 1165 is disposed at an innermost side, and the other lead wires 1160, 1161, 1162, 1163 and 1164 are disposed along the lead wire 1165. The shortest lead wire 1183 of the lead wires 1180, 1181, 1182, 1183, 1184, 1185, 1186 and 1187 is a reference, and the other lead wires 1180, 1181, 1182, 1184, 1185, 1186 and 1187 are disposed along the lead wire 1183.

1.7 Planar Shapes of Upper Electrode and Lower Electrode

Figure 4:
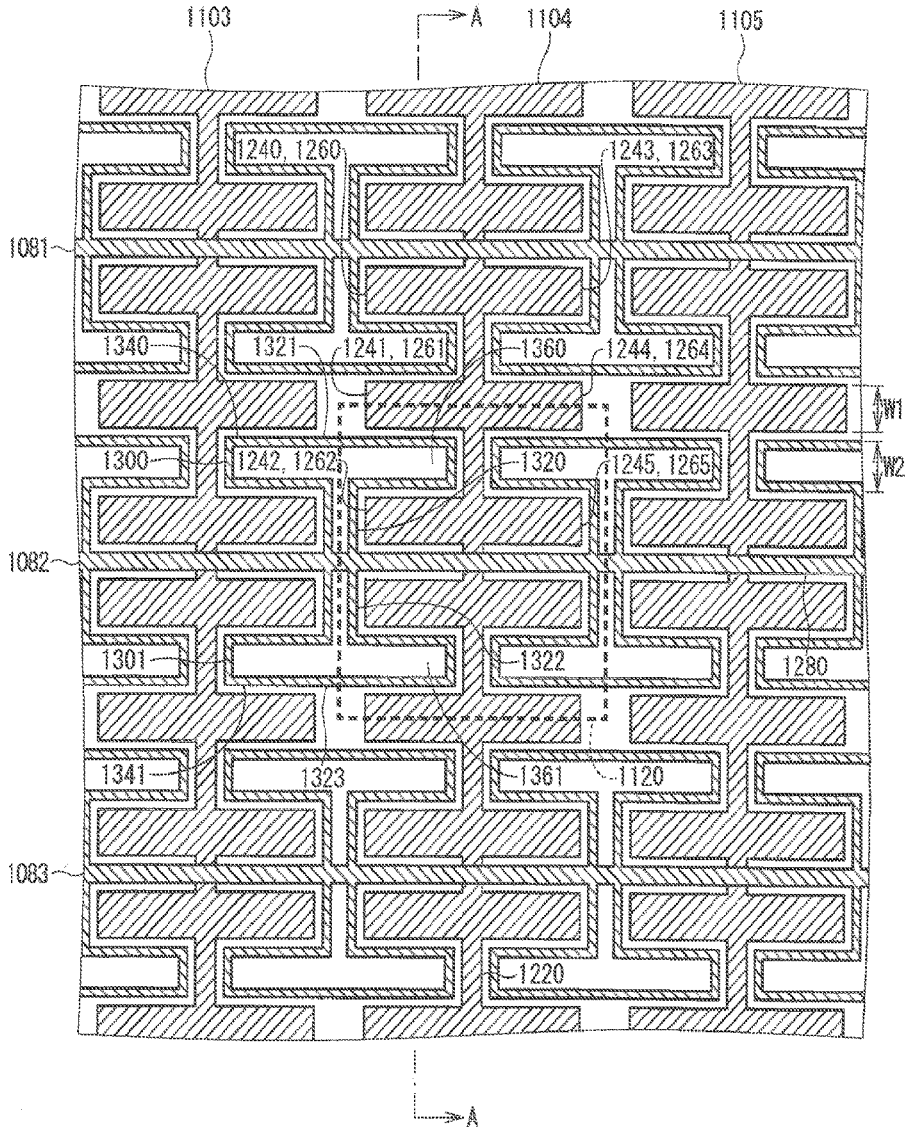
FIG. 4 is an enlarged plan view illustrating an upper electrode and a lower electrode of the touch screen according to the first preferred embodiment.

A schematic view of FIG. 4 is an enlarged plan view illustrating the upper electrode and the lower electrode of the touch screen according to the first preferred embodiment.

FIG. 4 illustrates an area including nine sensor units which configure three rows and three columns. FIG. 4 illustrates the rectangle 1120 illustrating one sensor unit.

As illustrated in FIG. 4, each of the column direction wires 1100, 1101, 1102, 1103, 1104, 1105, 1106 and 1107 includes a linear portion 1220, and includes a plurality of repetition units each including branch portions 1240, 1241, 1242, 1243, 1244 and 1245. A plurality of repetition units is regularly aligned in the column direction. The linear portion 1220 extends in the column direction. The branch portions 1240, 1241 and 1242 are branched from the linear portion 1220 toward one side and respectively include extended portions 1260, 1261, and 1262 which extend in the row direction. The branch portions 1243, 1244 and 1245 are branched from the linear portion 1220 toward the other side and respectively include extended portions 1263, 1264, and 1265 which extend in the row direction. The linear portion 1220 is arranged over the six sensor units aligned in the column direction. Each of the branch portions 1240, 1242, 1243 and 1245 is disposed to fit in one sensor unit. Each of the branch portions 1241 and 1244 is disposed across two sensor units neighboring in the column direction.

Each of the row direction wires 1080, 1081, 1082, 1083, 1084 and 1085 includes a linear portion 1280, and includes a plurality of repetition units each including branch portions 1300 and 1301. A plurality of repetition units is regularly aligned in the row direction. The linear portion 1280 extends in the row direction. The branch portion 1300 is branched from the linear portion 1280 toward one side and includes an extended portion 1320 which extends in the column direction and an extended portion 1321 which extends in the row direction. The branch portion 1301 is branched from the linear portion 1280 toward the other side and includes an extended portion 1322 which extends in the column direction and an extended portion 1323 which extends in the row direction. The linear portion 1280 is disposed across eight sensor units aligned in the row direction. Each of the branch portions 1300 and 1301 is disposed across two sensor units neighboring in the row direction.

The linear portion 1220 which extends in the column direction may be replaced with a linear portion which extends in a direction different from the column direction. The linear portion 1280 which extends in the row direction may be replaced with a linear portion which extends in a direction other than the row direction. In this regard, the direction in which the linear portion of the latter extends is not parallel to a direction in which the linear portion of the former extends.

The branch portions 1240, 1241, 1242, 1243, 1244 and 1245 having belt-like planar shapes may be replaced with branch portions having other planar shapes. The branch portions 1300 and 1301 having belt-like planar shapes including T-shaped branches may be replaced with branch portions having other planar shapes.

The linear portion 1280 three-dimensionally intersects the linear portion 1220, yet does not three-dimensionally intersect the branch portions 1240, 1241, 1242, 1243, 1244 and 1245. The linear portion 1280 three-dimensionally intersects the linear portion 1220, and therefore the linear portion 1280 is separated from the linear portion 1220 in the normal direction of the one main surface 1060 of the transparent substrate 1020 such that the linear portion 1280 is not in contact with the linear portion 1220 at a three-dimensional intersection position.

The branch portions 1300 and 1301 include rim portions 1340 and 1341, respectively. The rim portions 1340 and 1341 go along outlines of the branch portions 1300 and 1301, respectively. At the branch portion 1300, a cavity portion 1360 surrounded by the rim portion 1340 and the linear portion 1280 is formed. At the branch portion 1301, a cavity portion 1361 surrounded by the rim portion 1341 and the linear portion 1280 is formed. The rim portions 1340 and 1341 are provided with patterns having electrical conductivity yet the cavity portions 1360 and 1361 are not provided with patterns having electrical conductivity. When seen in a plan view in the normal direction of the one main surface 1060 of the transparent substrate 1020, the rim portions 1340 and 1341 include portions parallel along the outlines of the linear portion 1220, the branch portion 1240, the branch portion 1241, the branch portion 1242, the branch portion 1243, the branch portion 1244 or the branch portion 1245, yet do not include a portion parallel along the outline of the linear portion 1280. That the rim portions are parallel along the outline refers to that the rim portion is parallel to the outline, is disposed with a gap from the outline and extends. A portion of the rim portion 1340 parallel along the outline of the linear portion 1220, the branch portion 1240, the branch portion 1241, the branch portion 1242, the branch portion 1243, the branch portion 1244 or the branch portion 1245 is a main portion of the rim portion 1340, and desirably occupies half or more of the rim portion 1340. A portion of the rim portion 1341 parallel along the outline of the linear portion 1220, the branch portion 1240, the branch portion 1241, the branch portion 1242, the branch portion 1243, the branch portion 1244 or the branch portion 1245 is a main portion of the rim portion 1341, and desirably occupies half or more of the rim portion 1341.

The rim portions 1340 and 1341 include portions parallel along the outline of the linear portion 1220, the branch portion 1240, the branch portion 1241, the branch portion 1242, the branch portion 1243, the branch portion 1244 or the branch portion 1245. Consequently, a distance from the excitation wires to the detection wires is short, a capacitance is formed between the excitation wires and the detection wires, and a position coordinate indicating a touch position is specified based on a change in the capacitance when there is a touch by the pointing body which is a conductor.

Further, the cavity portions 1360 and 1361 are formed at the branch portions 1300 and 1301 respectively, so that the coupling capacitance between the excitation wires and the detection wires is low, and the coupling capacitance between the pointing body, and the excitation wires and the detection wires is high. Further, a ground capacitance between the excitation wires and the ground is low. By this means, even when the distance from the excitation wires and the detection wires to the pointing body is long, it is possible to detect a change in the mutual capacitance and specify the position coordinate indicating the touch position. This will be described in detail in a section of "5 Comparison between First Preferred Embodiment and Reference Example".

Widths W1 of the extended portions 1260, 1261, 1262, 1263, 1264 and 1265 are the same as widths W2 of the extended portions 1321 and 1323. The width of each extended portion which is each of the extended portions 1260, 1261, 1262, 1263, 1264, 1265, 1321 and 1323 is a size of each extended portion in a direction vertical to a direction in which each extended portion extends.

2 Second Preferred Embodiment

The second preferred embodiment relates to an upper electrode and a lower electrode respectively replaced from an upper electrode and a lower electrode of a touch screen according to the first preferred embodiment.

Figure 5:
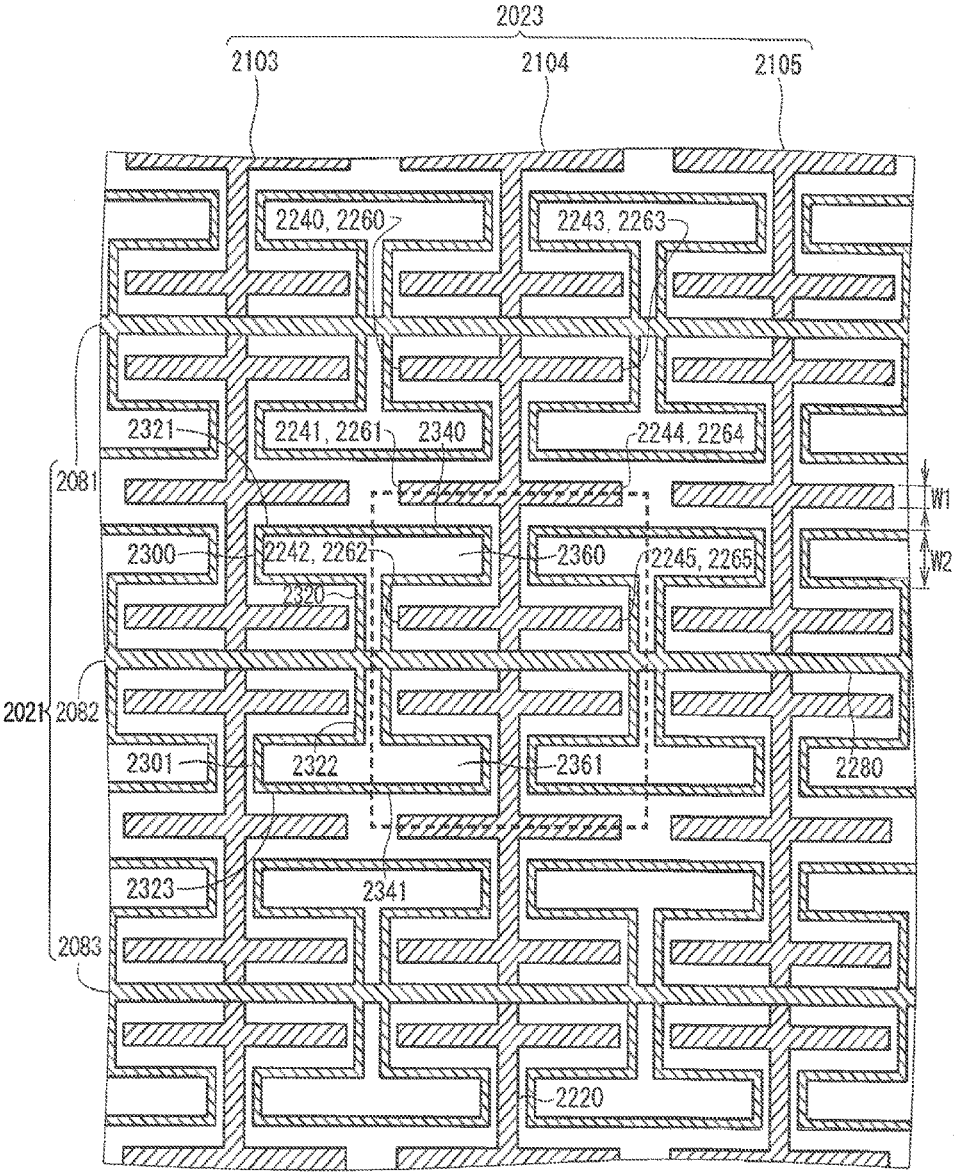
FIG. 5 is an enlarged plan view illustrating an upper electrode and a lower electrode according to a second preferred embodiment.

FIG. 5 is an enlarged plan view illustrating the upper electrode and the lower electrode according to the second preferred embodiment.

A main difference between the first preferred embodiment and the second preferred embodiment is that, while a width W1 is the same as a width W2 in the first preferred embodiment, the width W1 is narrower than the width W2 in the second preferred embodiment.

An upper electrode 2023 illustrated in FIG. 5 includes column direction wires 2103, 2104, 2105 and so on. A lower electrode 2021 illustrated in FIG. 5 includes row direction wires 2081, 2082, 2083 and so on.

Each of the column direction wires 2103, 2104, 2105 and so on includes a linear portion 2220, and includes a plurality of repetition units each including branch portions 2240, 2241, 2242, 2243, 2244 and 2245. The linear portion 2220 extends in the column direction. The branch portions 2240, 2241 and 2242 are branched from the linear portion 2220 toward one side and respectively include extended portions 2260, 2261 and 2262 which extend in a row direction. The branch portions 2243, 2244 and 2245 are branched from the linear portion 2220 toward the other side and respectively include extended portions 2263, 2264 and 2265 which extend in the row direction.

Each of the row direction wires 2081, 2082, 2083 and so on includes a linear portion 2280, and includes a plurality of repetition units each including branch portions 2300 and 2301. The linear portion 2280 extends in the row direction.

The branch portion 2300 is branched from the linear portion 2280 toward one side and includes an extended portion 2320 which extends in a column direction and an extended portion 2321 which extends in the row direction. The branch portion 2301 is branched from the linear portion 2280 toward the other side and includes an extended portion 2322 which extends in the column direction and an extended portion 2323 which extends in the row direction.

The linear portion 2280 three-dimensionally intersects the linear portion 2220, yet does not three-dimensionally intersect the branch portions 2240, 2241, 2242, 2243, 2244 and 2245.

The branch portions 2300 and 2301 include rim portions 2340 and 2341, respectively. At the branch portion 2300, a cavity portion 2360 surrounded by the rim portion 2340 and the linear portion 2280 is formed. At the branch portion 2301, a cavity portion 2361 surrounded by the rim portion 2341 and the linear portion 2280 is formed. When seen in a plan view in a normal direction of one main surface 1060 of a transparent substrate 1020, the rim portions 2340 and 2341 include portions parallel along an outline of the linear portion 2220, the branch portion 2240, the branch portion 2241, the branch portion 2242, the branch portion 2243, the branch portion 2244 and the branch portion 2245, yet do not include a portion parallel along an outline of the linear portion 2280.

The rim portions 2340 and 2341 include the portions parallel along the outline of the linear portion 2220, the branch portion 2240, the branch portion 2241, the branch portion 2242, the branch portion 2243, the branch portion 2244 or the branch portion 2245. Consequently, a distance from excitation wires to detection wires is short, a capacitance is formed between the excitation wires and the detection wires, and a position coordinate indicating a touch position is specified based on a change in the capacitance when there is a touch by a pointing body.

Further, the cavity portions 2360 and 2361 are formed at the branch portions 2300 and 2301 respectively, so that the coupling capacitance between the excitation wires and the detection wires is low, and a coupling capacitance between the pointing body, and the excitation wires and the detection wires is high. Further, a ground capacitance between the excitation wires and a ground is low. Consequently, even when a distance from the excitation wires and the detection wires to the pointing body is long, it is possible to detect a change in a mutual capacitance, and specify a position coordinate indicating a touch position.

The widths W1 of the extended portions 2260, 2261, 2262, 2263, 2264 and 2265 are narrower than the widths W2 of the extended portions 2321 and 2323. For example, the widths W1 are half the widths W2. The widths W1 are narrower than the widths W2. An electric field produced between the extended portions 2260, 2261, 2262, 2263, 2264 and 2265 and the extended portions 2321 and 2323 is different from an electric field produced between extended portions 1260, 1261, 1262, 1263, 1264 and 1265 and extended portions 1321 and 1323, and a position at which the electric field of the former reaches differs from a position at which the electric field of the latter reaches. This means that, by adjusting a ratio of the widths W2 with respect to the widths W1 according to the thickness of a transparent substrate 1026, it is possible to increase a touch capacitance and improve touch position detection capability. This will be described in detail in a section "6 Comparison between First Preferred embodiment, Second Preferred Embodiment and Reference Example".

Figure 6:
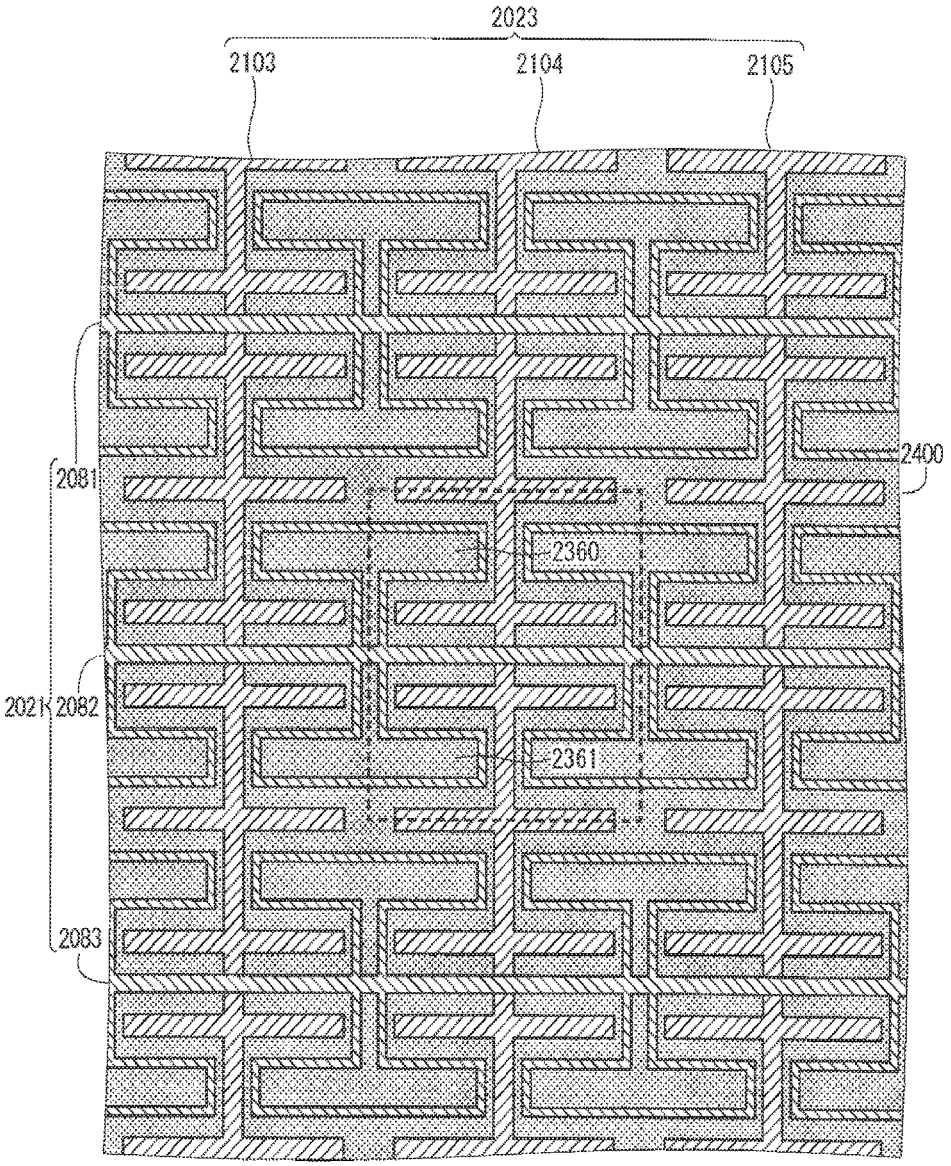
FIG. 6 is an enlarged plan view illustrating a dummy pattern desirably added to the upper electrode and the lower electrode according to the second preferred embodiment.

FIG. 6 is an enlarged plan view illustrating a dummy pattern which is desirably added to the upper electrode and the lower electrode according to the second preferred embodiment.

A dummy pattern 2400 illustrated in FIG. 6 fills the cavity portions 2360 and 2361, and a gap between the upper electrode 2023 and the lower electrode 2021. The dummy pattern 2400 is made of an insulation body, and does not electrically conduct with the upper electrode 2023 and the lower electrode 2021. The dummy pattern 2400 makes the outline of the upper electrode 2023 and the outline of the lower electrode 2021 hardly visible, and provides a good-looking touch screen. The dummy pattern 2400 does not lose an advantage according to the second preferred embodiment.

The same dummy pattern may be added to an upper electrode 1023 and a lower electrode 1021 of a touch screen 1000 according to the above first preferred embodiment. The same dummy pattern may be added to an upper electrode and a lower electrode according a third preferred embodiment described below.

3 Third Preferred Embodiment

The third preferred embodiment relates to an upper electrode and a lower electrode respectively replaced from an upper electrode and a lower electrode of a touch screen according to the first preferred embodiment.

Figure 7:
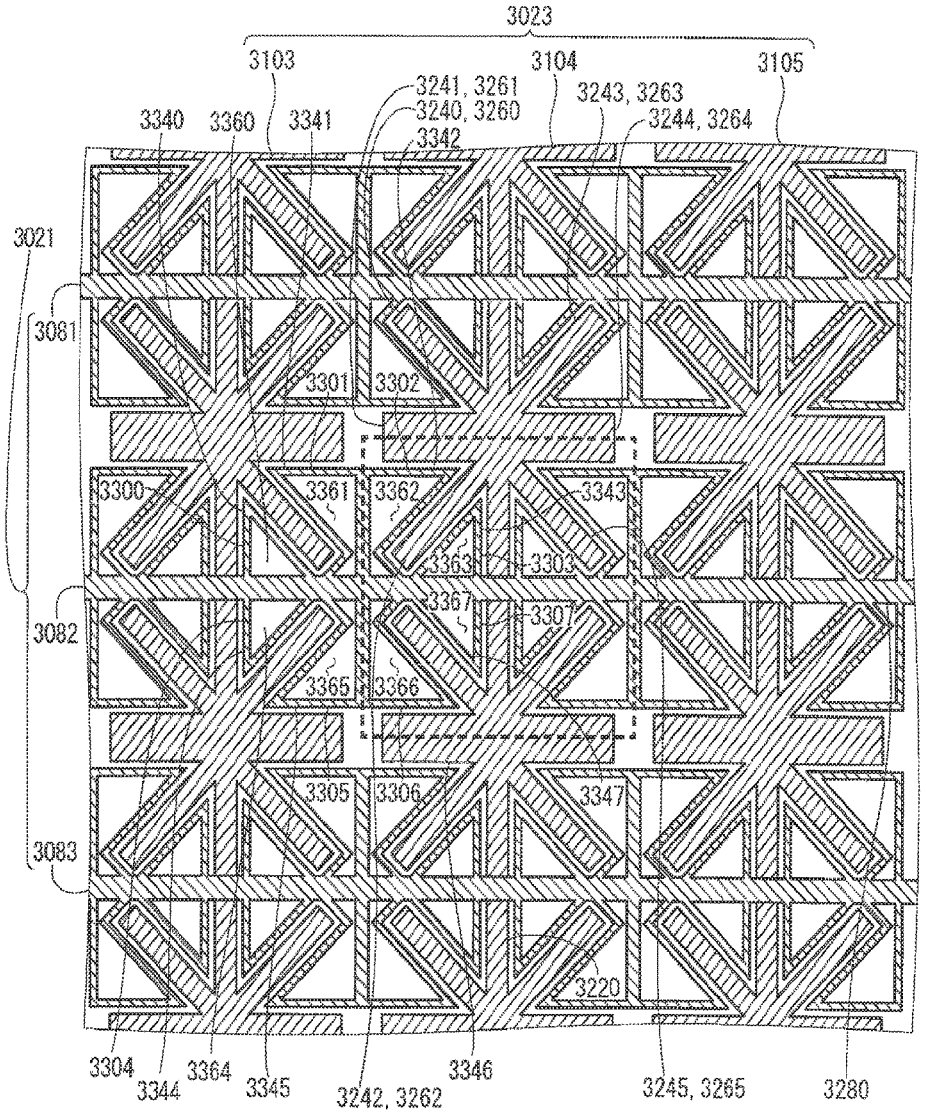
FIG. 7 is an enlarged plan view illustrating an upper electrode and a lower electrode according to a third preferred embodiment.

A schematic view of FIG. 7 is an enlarged plan view illustrating the upper electrode and the lower electrode according to the third preferred embodiment.

An upper electrode 3023 illustrated in FIG. 7 includes column direction wires 3103, 3104, 3105 and so on. A lower electrode 3021 illustrated in FIG. 7 includes row direction wires 3081, 3082, 3083 and so on.

Each of the column direction wires 3103, 3104, 3105 and so on includes a linear portion 3220, and includes a plurality of repetition units each including branch portions 3240, 3241, 3242, 3243, 3244 and 3245. The linear portion 3220 extends in a column direction. The branch portion 3240 is branched from the linear portion 3220 toward one side and includes an extended portion 3260 which extends in a direction inclining at 45° from a row direction. The branch portion 3241 is branched from the linear portion 3220 toward one side and includes an extended portion 3261 which extends in the row direction. The branch portion 3242 is branched from the linear portion 3220 toward one side and includes an extended portion 3262 which extends in a direction inclining at 45° from the row direction. The extended portion 3262 is symmetrical with respect to the extended portion 3260 around the extended portion 3261. The branch portion 3243 is branched from the linear portion 3220 toward the other side and includes an extended portion 3263 which extends in the direction inclining at 45° from the row direction. The branch portion 3244 is branched from the linear portion 3220 toward the other side and includes an extended portion 3264 which extends in the row direction. The branch portion 3245 is branched from the linear portion 3220 toward the other side and includes an extended portion 3265 which extends in the direction inclining at 45° from the row direction. The extended portion 3265 is symmetrical with respect to the extended portion 3263 around the extended portion 3264.

Each of the row direction wires 3081, 3082, 3083 and so on includes a linear portion 3280, and includes a plurality of repetition units each including branch portions 3300, 3301, 3302, 3303, 3304, 3305, 3306 and 3307. The linear portion 3280 extends in the row direction. Each of the branch portions 3300, 3301, 3302 and 3303 is branched from the linear portion 3280 toward one side. Each of the branch portions 3304, 3305, 3306 and 3307 is branched from the linear portion 3280 toward the other side.

The linear portion 3280 three-dimensionally intersects the linear portion 3220, yet does not three-dimensionally intersect the branch portions 3240, 3241, 3242, 3243, 3244 and 3245.

The branch portions 3300, 3301, 3302, 3303, 3304, 3305, 3306 and 3307 include rim portions 3340, 3341, 3342, 3343, 3344, 3345, 3346 and 3347, respectively. At the branch portion 3300, a cavity portion 3360 surrounded by the rim portion 3340 and the linear portion 3280 is formed. At the branch portion 3301, a cavity portion 3361 surrounded by the rim portion 3341 and the linear portion 3280 is formed. At the branch portion 3302, a cavity portion 3362 surrounded by the rim portion 3342 and the linear portion 3280 is formed. At the branch portion 3303, a cavity portion 3363 surrounded by the rim portion 3343 and the linear portion 3280 is formed. At the branch portion 3304, a cavity portion 3364 surrounded by the rim portion 3344 and the linear portion 3280 is formed. At the branch portion 3305, a cavity portion 3365 surrounded by the rim portion 3345 and the linear portion 3280 is formed. At the branch portion 3306, a cavity portion 3366 surrounded by the rim portion 3346 and the linear portion 3280 is formed. At the branch portion 3307, a cavity portion 3367 surrounded by the rim portion 3347 and the linear portion 3280 is formed. The rim portions 3340, 3341, 3342, 3343, 3344, 3345, 3346 and 3347 are provided with patterns having electrical conductivity yet the cavity portions 3360, 3361, 3362, 3363, 3364, 3365, 3366 and 3367 are not provided with patterns having electrical conductivity. When seen in a plan view in a normal direction of one main surface 1060 of a transparent substrate 1020, the rim portions 3340, 3341, 3342, 3343, 3344, 3345, 3346 and 3347 include portions parallel along an outline of the linear portion 3220, the branch portion 3240, the branch portion 3241, the branch portion 3242, the branch portion 3243, the branch portion 3244 or the branch portion 3245, yet do not include a portion parallel along an outline of the linear portion 3280.

While branch portions 1240, 1241, 1242, 1243, 1244, 1245, 1300 and 1301 have rectangular patterns in the first preferred embodiment, the branch portions 3240, 3241, 3242, 3243, 3244, 3245, 3300, 3301, 3302, 3303, 3304, 3305, 3306 and 3307 have different shape patterns in the third preferred embodiment. However, similarly to the first preferred embodiment. according to the third preferred embodiment, even when a distance from excitation wires and detection wires to a pointing body is long, it is possible to detect a change in a mutual capacitance, and specify a position coordinate indicating a touch position. In the third preferred embodiment, too, by adjusting the widths of the branch portions 3240, 3241, 3242, 3243, 3244 and 3245 according to the thickness of a transparent substrate 1026, it is possible to increase a touch capacitance and improve touch position detection capability.

The branch portions 3240, 3241, 3242, 3243, 3244, 3245, 3300, 3301, 3302, 3303, 3304, 3305, 3306 and 3307 having the different shape patterns may be replaced with a branch portion having other different shape patterns. That is, by forming cavity portions at branch portions irrespectively of patterns of the branch portions, it is possible to detect a change in a mutual capacitance and specify a position coordinate indicating a touch position even when the distance from the excitation wires and the detection wires to a pointing body is long.

4 Reference Example

Figure 8:
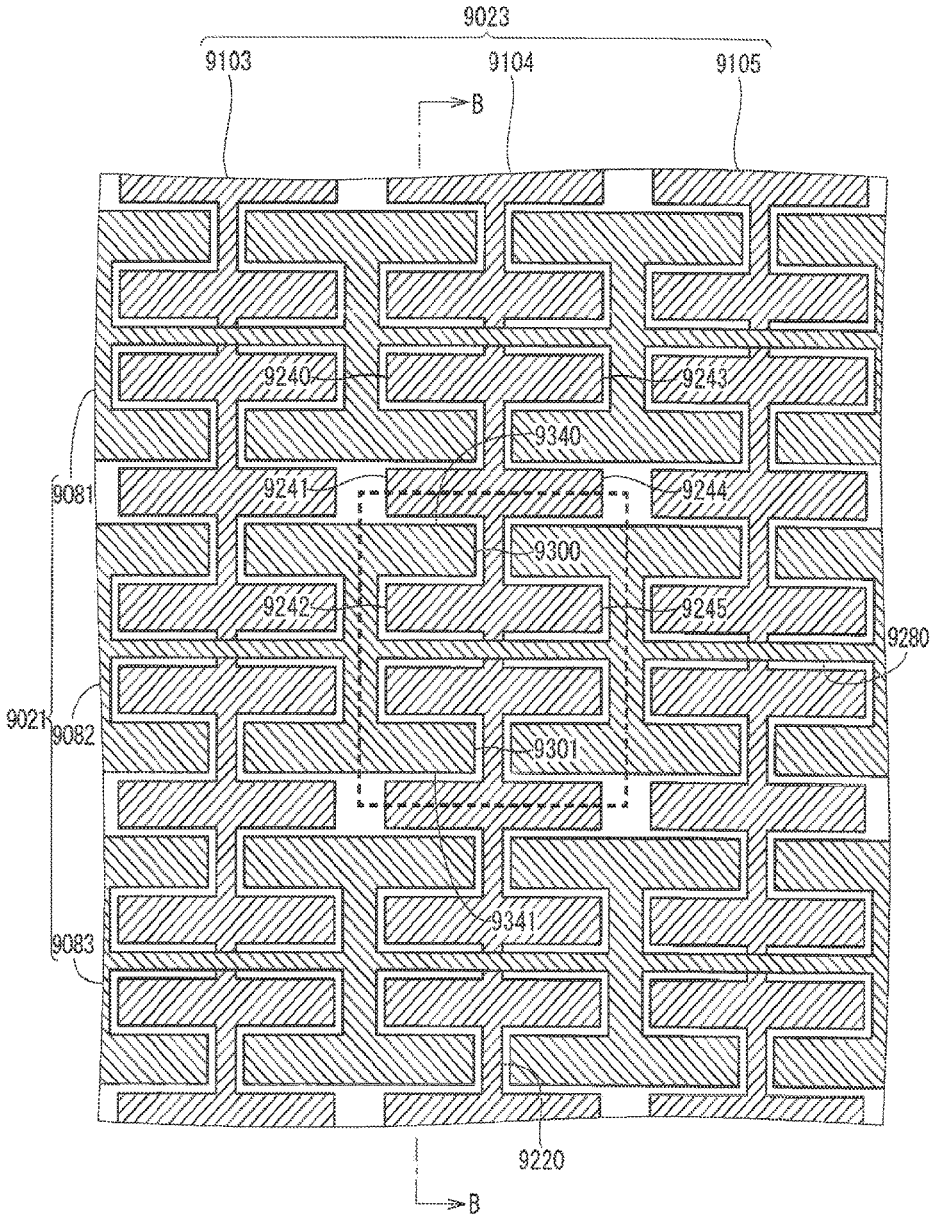
FIG. 8 is an enlarged plan view illustrating an upper electrode and a lower electrode according to a reference example.

A schematic view of FIG. 8 is an enlarged plan view illustrating an upper electrode and a lower electrode according to the reference example compared with an upper electrode and a lower electrode according to the first preferred embodiment.

A difference between the first preferred embodiment and the reference example is that, while cavity portions 1360 and 1361 are formed at branch portions 1300 and 1301 in the first preferred embodiment respectively, cavity portions are not formed at branch portions 9300 and 9301 in the reference example.

An upper electrode 9023 illustrated in FIG. 8 includes column direction wires 9103, 9104, 9105 and so on. A lower electrode 9021 illustrated in FIG. 8 includes row direction wires 9081, 9082, 9083 and so on.

Each of the column direction wires 9103, 9104, 9105 and so on includes a linear portion 9220, and includes a plurality of repetition units each including branch portions 9240, 9241, 9242, 9243, 9244 and 9245. The linear portion 9220 extends in a column direction. The branch portions 9240, 9241 and 9242 are branched from the linear portion 9220 toward one side. The branch portions 9243, 9244 and 9245 are branched from the linear portion 9220 toward the other side.

Each of the row direction wires 9081, 9082, 9083 and so on includes a linear portion 9280, and includes a plurality of repetition units each including the branch portions 9300 and 9301. The linear portion 9280 extends in a row direction. The branch portion 9300 is branched from the linear portion 9280 toward one side. The branch portion 9301 is branched from the linear portion 9280 toward the other side.

The linear portion 9280 three-dimensionally intersects the linear portion 9220, yet does not three-dimensionally intersect the branch portions 9240, 9241, 9242, 9243, 9244 and 9245.

The branch portions 9300 and 9301 include rim portions 9340 and 9341, respectively. However, in the reference example, cavity portions are not formed at the branch portions 9300 and 9301, and a pattern having electrical conductivity is provided on the entire branch portions 9300 and 9301. When seen in a plan view in a normal direction of one main surface 1060 of a transparent substrate 1020, the rim portions 9340 and 9341 include portions parallel along an outline of the linear portion 9220, the branch portion 9240, the branch portion 9241, the branch portion 9242, the branch portion 9243, the branch portion 9244 or the branch portion 9245, yet do not include portions parallel along an outline of the linear portion 9280.

5 Comparison Between First Preferred Embodiment and Reference Example

Figure 9:
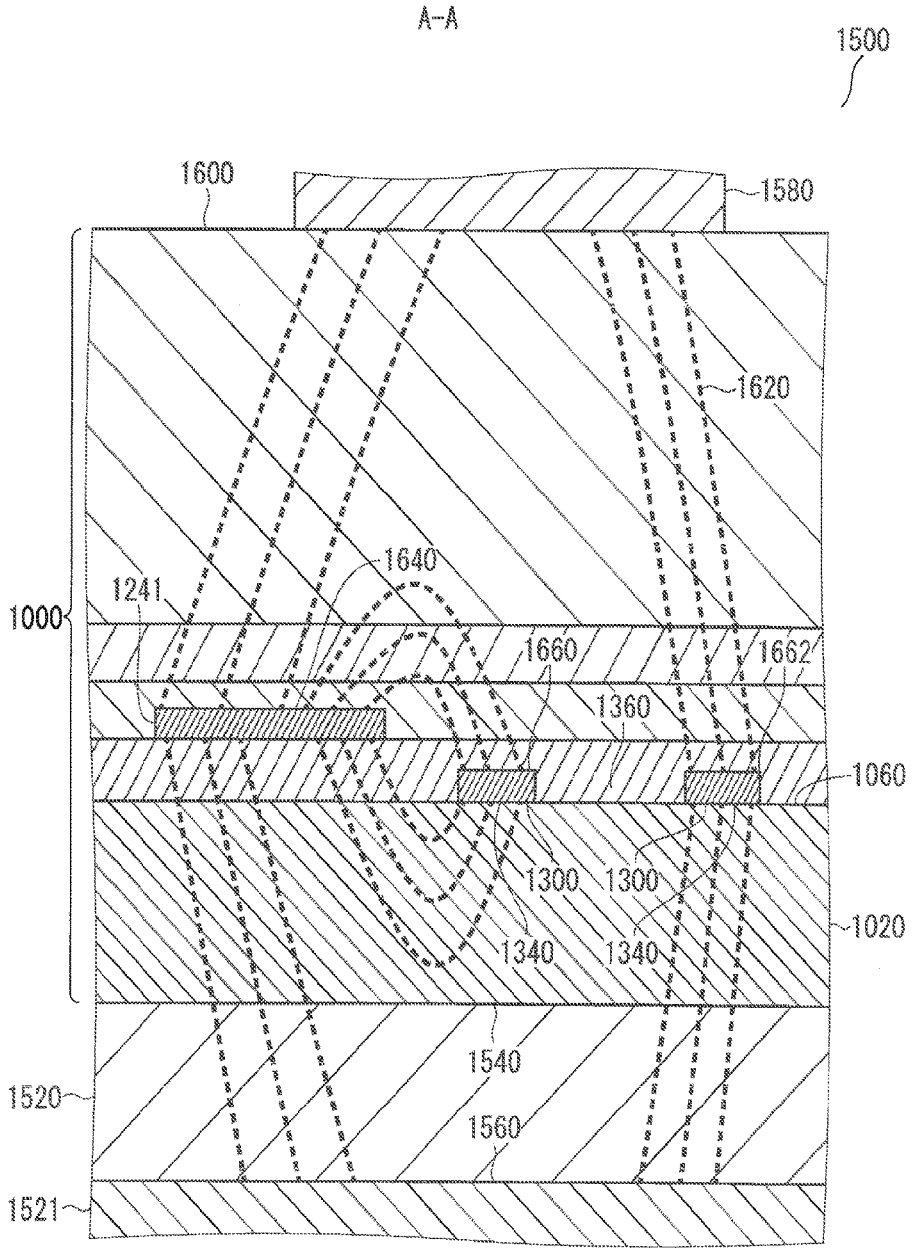
FIG. 9 is a cross-sectional view illustrating a display device including the touch screen according to the first preferred embodiment.

FIG. 9 is a cross-sectional view illustrating a display device including a touch screen according to the first preferred embodiment.

A display device 1500 illustrated in FIG. 9 includes a touch screen 1000, a pressure sensitive adhesive layer 1520 and a display element 1521. One main surface 1540 of the touch screen 1000 is applied to a main surface 1560 of the display element 1521 with the pressure sensitive adhesive layer 1520 interposed therebetween.

FIG. 9 is a cross-sectional view illustrating a cross section at a position of a cut line A-A of FIG. 4, i.e., a cross section vertical to one main surface 1060 of a transparent substrate 1020 and crossing branch portions 1241 and 1300. FIG. 9 illustrates broken lines of electric force 1620 indicating an electric field situation in a case where a finger 1580 touches another main surface 1600 of the touch screen 1000 in a detectable area.

In the display device 1500, a cavity portion 1360 is formed at the branch portion 1300, and a second portion to 1662 of a rim portion 1340 is partitioned from a first portion 1660 of the rim portion 1340 by the cavity portion 1360 when seen from a specific portion 1640 of the branch portion 1241. The second portion 1662 conducts with the first portion 1660. The second portion 1662 is partitioned from the first portion 1660 by the cavity portion 1360. When reaching the branch portion 1300, the lines of electric force 1620 extending from the specific portion 1640 of the branch portion 1241 concentrate on the first portion 1660 relatively close to the specific portion 1640, and the second portion 1662 relatively far from the specific portion 1640.

Figure 10:
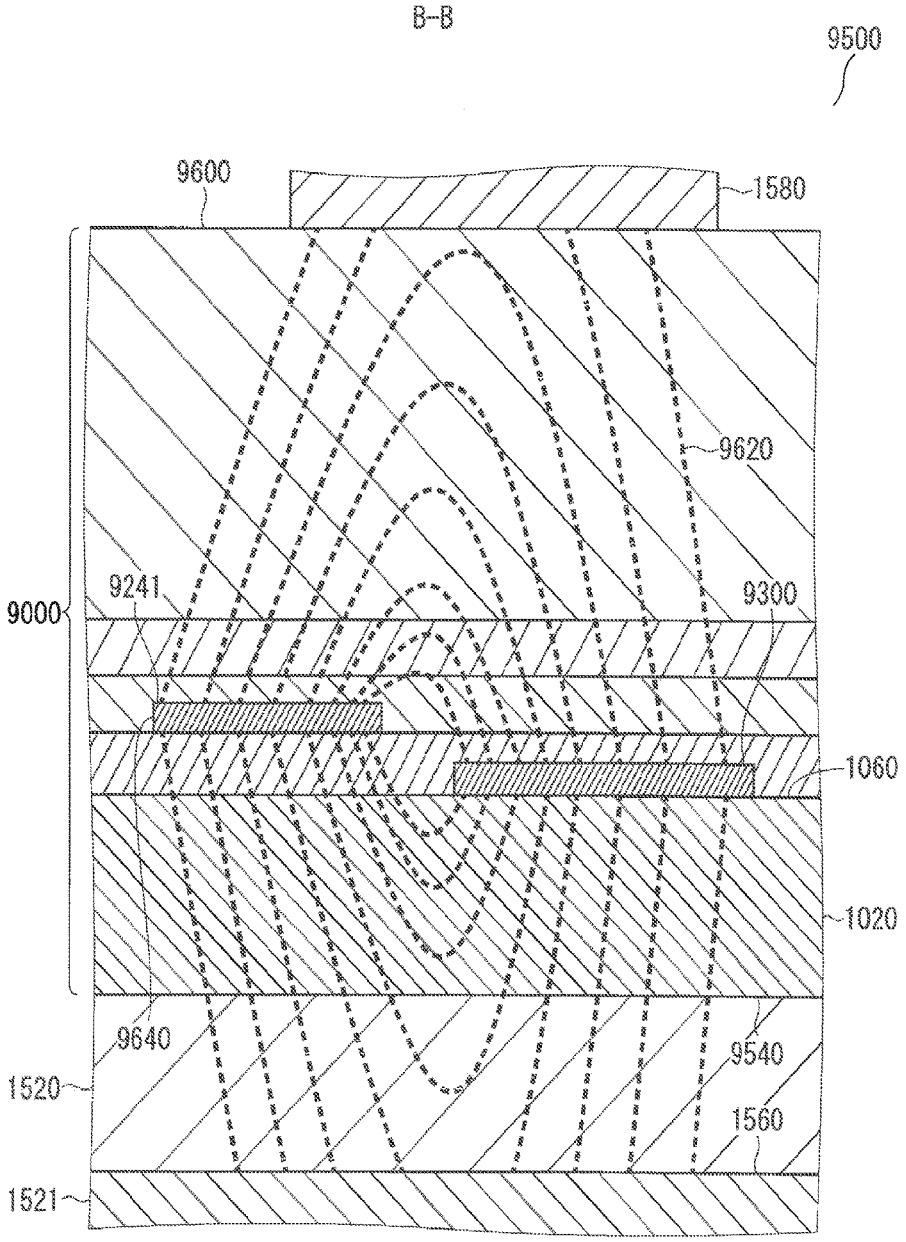
FIG. 10 is a cross-sectional view illustrating a display device including a touch screen formed by replacing the upper electrode and the lower electrode of the touch screen according to the first preferred embodiment with the upper electrode and the lower electrode according to the reference example.

FIG. 10 is a cross-sectional view illustrating a display device including a touch screen formed by replacing the upper electrode and the lower electrode of the touch screen according to the first preferred embodiment with the upper electrode and the lower electrode according to the reference example.

A display device 9500 illustrated in FIG. 10 includes a touch screen 9000, the pressure sensitive adhesive layer 1520 and the display element 1521. One main surface 9540 of the touch screen 9000 is applied to the main surface 1560 of the display element 1521 with the pressure sensitive adhesive layer 1520 interposed therebetween.

FIG. 10 is a cross-sectional view illustrating a cross section at a position of a cut line B-B of FIG. 8, i.e., a cross section vertical to the one main surface 1060 of the transparent substrate 1020 and crossing branch portions 9241 and 9300. FIG. 10 illustrates broken lines of electric force 9620 illustrating an electric field situation in a case where a finger 1580 touches another main surface 9600 of the touch screen 9000 in a detectable area.

In the display device 9500, a cavity portion is not formed at the branch portion 9300. The cavity portion is not formed at the branch portion 9300, so that, when reaching the branch portion 9300, the lines of electric force 9620 extending from a specific portion 9640 of the branch portion 9241 uniformly spread to the entire branch portion 9300.

As is understandable from comparison between the lines of electric force 9620 illustrated in FIG. 10 and lines of electric force 1620 illustrated in FIG. 9, when the cavity portion 1360 is formed at the branch portion 1300, the lines of electric force 1620 densely concentrate and reach a position distant from excitation wires and detection wires compared to a case where the cavity portion is not formed at the branch portion 9300. The dense concentration of the lines of electric force 1620 means a strong electric field. This is understandable from the Gauss's law.

Hence, when the cavity portion 1360 is formed at the branch portion 1300, a coupling capacitance between the excitation wires and the detection wires is low, an electric field at a position distant from the excitation wires and the detection wires is strong, and a change in the capacitance between the excitation wires and the detection wires in a case where there is a touch by the finger 1580 is great. Further, when the cavity portion 1360 is formed at the branch portion 1300, a capacitance between the excitation wires and the display element is low, and a change in the capacitance between the excitation wires and the detection wires in a case where there is the touch by the finger 1580 is great. Consequently, even when the transparent substrate 1026 is thick, it is possible to detect a position coordinate indicating a touch position.

Figure 11:
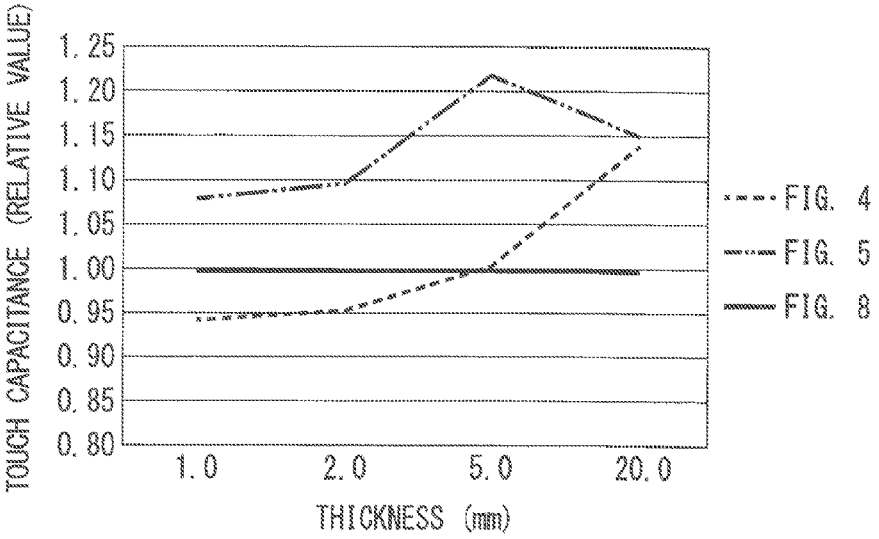
FIG. 11 is a graph illustrating a change in a touch capacitance with respect to the thickness of a transparent electrode in a case where patterns of the upper electrode and the lower electrode are as illustrated in each of FIGS. 4, 5 and 8.
Figure 12:
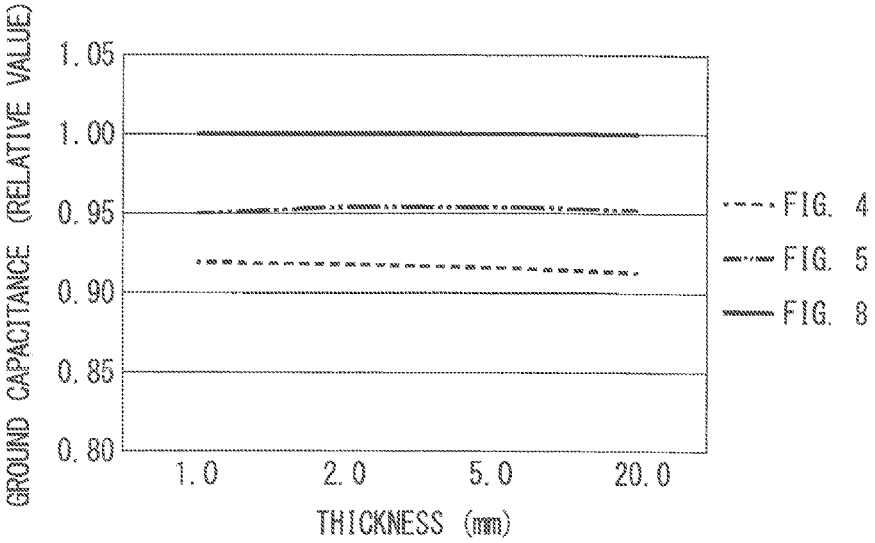
FIG. 12 is a graph illustrating a change in a ground capacitance with respect to the thickness of the transparent electrode in a case where the patterns of the upper electrode and the lower electrode are as illustrated in each of FIGS. 4, 5 and 8.
Figure 13:
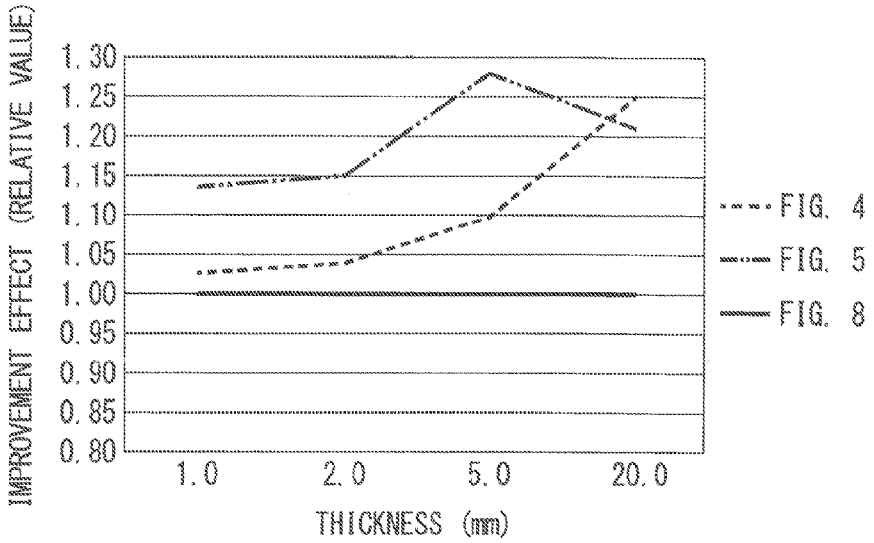
FIG. 13 is a graph illustrating a change in an improvement effect with respect to the thickness of the transparent electrode in a case where the patterns of the upper electrode and the lower electrode are as illustrated in each of FIGS. 4, 5 and 8.

6 Comparison Between First Preferred Embodiment, Second Preferred Embodiment and Reference Example FIG. 11 illustrates a graph illustrating a change in a touch capacitance with respect to the thickness of the transparent substrate in a case where patterns of the upper electrode and the lower electrode are as illustrated in each of FIGS. 4, 5 and 8. FIG. 12 illustrates a graph illustrating a change in a ground capacitance with respect to the thickness of the transparent substrate in a case where the patterns of the upper electrode and the lower electrode are as illustrated in each of FIGS. 4, 5 and 8. FIG. 13 illustrates a graph illustrating a change in an improvement effect with respect to the thickness of the transparent substrate in a case where the patterns of the upper electrode and the lower electrode are as illustrated in each of FIGS. 4, 5 and 8.

FIGS. 11, 12 and 13 illustrate the graphs obtained by simulation. According to the simulation, the transparent substrate 1026 is made of a glass material, the thickness of the transparent substrate 1026 is 1.0 mm, 2.0 mm, 5.0 mm and 20.0 mm, and the diameter of a touching finger is 7.0 mm. The improvement effect illustrated in FIG. 13 is an improvement effect of coordinate detection with a touch capacitance and a ground capacitance taken into account.

As illustrated in FIG. 13, the pattern of the upper electrode and the lower electrode illustrated in FIG. 4 can provide an improvement effect of approximately 25% when the thickness of the transparent substrate 1026 is 20.0 mm compared to a case of the pattern of the upper electrode and the lower electrode illustrated in FIG. 8. Further, the pattern of the upper electrode and the lower electrode illustrated in FIG. 5 can provide an improvement effect of approximately 27% when the thickness of the transparent substrate 1026 is 5.0 mm compared to a case of the pattern of the upper electrode and the lower electrode illustrated in FIG. 8. This means that, by adjusting the ratio of the widths W2 with respect to the widths W1, it is possible to adjust the thickness of the transparent substrate 1026 to maximize the improvement effect.

7 Fourth Preferred Embodiment

The fourth preferred embodiment relates to a touch panel.

Figure 14:
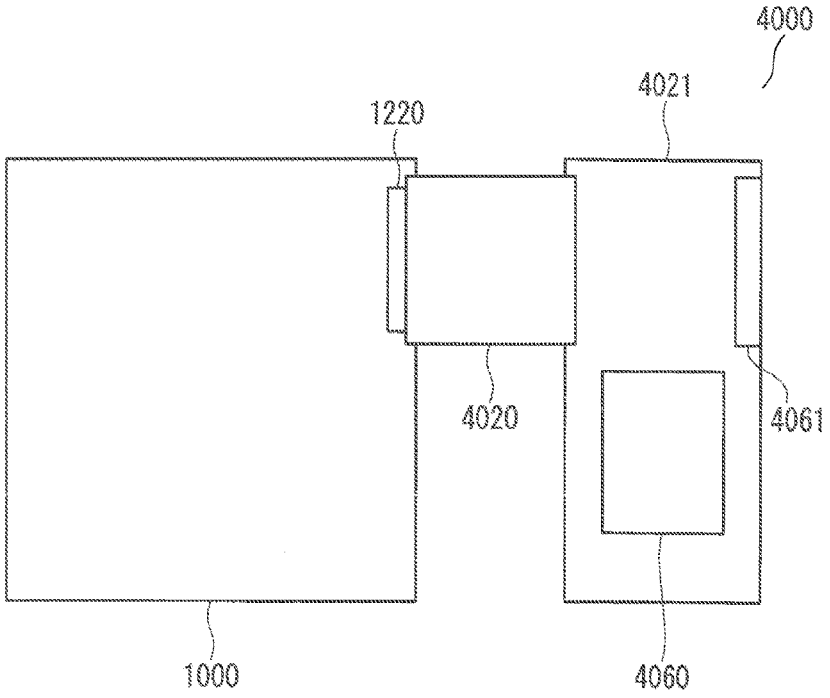
FIG. 14 is a plan view illustrating a touch panel according to a fourth preferred embodiment.

A schematic view of FIG. 14 is a plan view illustrating the touch panel according to the fourth preferred embodiment.

A touch panel 4000 illustrated in FIG. 14 includes a touch screen 1000 according to the first preferred embodiment, a flexible printed circuit board 4020 and a controller substrate 4021. The touch panel 4000 may include components other than these components. The controller substrate 4021 includes a detection circuit 4060 and an external connection terminal 4061. The controller substrate 4021 may include components other than these components.

The touch screen 1000 according to the first preferred embodiment may be replaced with a touch screen formed by replacing an upper electrode 1023 and a lower electrode 1021 of the touch screen 1000 according to the first preferred embodiment with an upper electrode 2023 and a lower electrode 2021 according to the second preferred embodiment, or may be replaced with a touch screen formed by replacing the upper electrode 1023 and the lower electrode 1021 of the touch screen 1000 according to the first preferred embodiment with an upper electrode 3023 and a lower electrode 3021 according to the third preferred embodiment.

The flexible printed circuit board 4020 includes a terminal that fits a terminal 1220 near one end of the flexible printed circuit board 4020. The terminal of the flexible printed circuit board 4020 is electrically connected with the terminal 1220 by an anisotropic conductive film. The other end of the flexible printed circuit board 4020 is electrically connected with the controller substrate 4021. By this means, row direction wires 1080, 1081, 1082, 1083, 1084 and 1085 and column direction wires 1100, 1101, 1102, 1103, 1104, 1105, 1106 and 1107 are electrically connected to the controller substrate 4021 via the flexible printed circuit board 4020.

The flexible printed circuit board 4020 may be replaced with other types of wires. The flexible printed circuit board 4020 may be omitted, and the controller substrate 4021 may be directly connected to the touch screen 1000. A function of the controller substrate 4021 may be implemented on the touch screen 1000. For example, the detection circuit 4060 may be mounted on a transparent substrate 1020 instead of the controller substrate 4021.

The detection circuit 4060 detects a touch position touched by a pointing body on the touch screen 1000 based on a capacitance between the upper electrode 1023 and the lower electrode 1021. Further, the detection circuit 4060 transmits a signal including a position coordinate indicating the detected touch position, to the external connection terminal 4061.

The detection circuit 4060 employs a detection logic of a projected capacitive system. The detection circuit 4060 detects a touch position based on the capacitance between the row direction wires 1080, 1081, 1082, 1083, 1084 and 1085 and the column direction wires 1100, 1101, 1102, 1103, 1104, 1105, 1106 and 1107 influenced by the capacitance between the pointing body, and the row direction wires 1080, 1081, 1082, 1083, 1084 and 1085 and the column direction wires 1100, 1101, 1102, 1103, 1104, 1105, 1106 and 1107.

The touch screen 1000 according to the first preferred embodiment is configured to be able to detect a change in a mutual capacitance and specify a position coordinate indicating a touch position even when a distance from excitation wires and detection wires to a pointing body is long. Consequently, the touch panel 4000 including the touch screen 1000 according to the first preferred embodiment has high sensitivity even when the transparent substrate 1026 is thick.

8 Fifth Preferred Embodiment

The fifth preferred embodiment relates to a display device.

Figure 15:
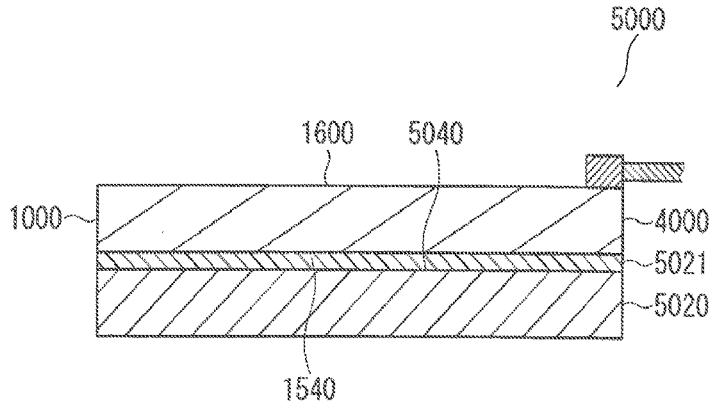
FIG. 15 is a cross-sectional view illustrating a display device according to a fifth preferred embodiment.

A schematic view of FIG. 15 is a cross-sectional view illustrating the display device according to the fifth preferred embodiment.

A display device 5000 illustrated in FIG. 15 includes a liquid crystal display element 5020, a pressure sensitive adhesive layer 5021 and a touch panel 4000 according to the fourth preferred embodiment. In some cases, the pressure sensitive adhesive layer 5021 is omitted, or the pressure sensitive adhesive layer 5021 is replaced with an adhesive layer.

The liquid crystal display element 5020 is also referred to as a liquid crystal display (LCD) and displays information. The liquid crystal display element 5020 may be replaced with other types of display elements. For example, the liquid crystal display element 5020 may be replaced with an organic electroluminescence (EL) display element.

The liquid crystal display element 5020 is attached to one main surface 1540 of a touch screen 1000 with the pressure sensitive adhesive layer 5021 interposed therebetween. A pointing body touches another main surface 1600 of the touch screen 1000. The touch screen 1000 is disposed near a user side compared to a display screen 5040 of the liquid crystal display element 5020. By this means, it is possible to obtain a display device with a touch panel having a function of detecting a touch position touched by the pointing body.

The touch screen 1000 according to the first preferred embodiment is configured to be able to detect a change in a mutual capacitance and specify a position coordinate indicating a touch position even when a distance from excitation wires and detection wires to the pointing body is long. Consequently, the display device 5000 including the touch screen 1000 according to the first preferred embodiment is a display device with a touch panel of a projected capacitive system which has high sensitivity and high visibility even when a transparent substrate 1026 is thick.

9 Sixth Preferred Embodiment

The sixth preferred embodiment relates to an electronic device.

Figure 16:
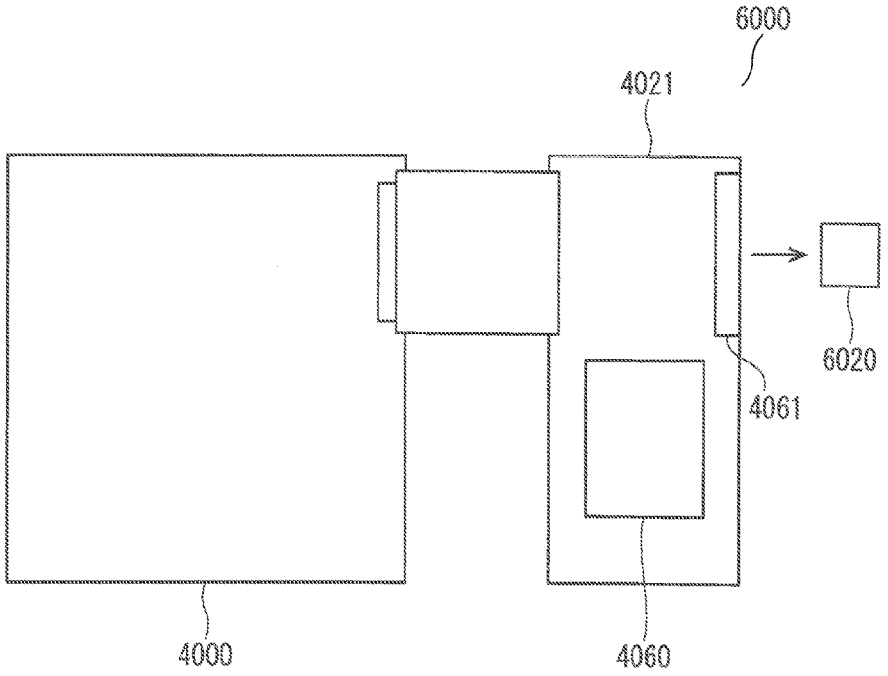
FIG. 16 is a block diagram illustrating an electronic device according to a sixth preferred embodiment.

FIG. 16 is a block diagram illustrating the electronic device according to the sixth preferred embodiment.

An electronic device 6000 illustrated in FIG. 16 includes a touch panel 4000 according to the fourth preferred embodiment and an electronic processing unit 6020.

The electronic processing unit 6020 receives an input of a signal outputted from an external connection terminal 4061 and including a position coordinate. The electronic processing unit 6020 is configured by a signal processing element which is an electronic element, and performs electronic processing on the position coordinate included in the inputted signal, and outputs a digital signal indicating the position coordinate. The electronic processing unit 6020 which is configured by the signal processing element may be replaced with other types of electronic processing units. For example, the electronic processing unit 6020 which is configured by the signal processing element may be replaced with an electronic processing unit which is configured by an electronic circuit including multiple electronic parts.

The electronic processing unit 6020 is connected to the touch panel 4000, so that it is possible to obtain an electronic device with a touch position detecting function such as a digitizer which outputs information of a touch position detected by the detection circuit 4060 to an external signal processing device such as a computer.

The signal processing element may be built in the controller substrate 4021. In this case, the signal processing element is configured to include an output function which complies with a bus standard such as the universal serial bus (USB), so that it is possible to obtain a highly versatile electronic device with a touch position detecting function.

The touch screen 1000 according to the first preferred embodiment is configured to be able to detect a change in a mutual capacitance and specify a position coordinate indicating a touch position even when a distance from excitation wires and detection wires to the pointing body is long. Consequently, the electronic device 6000 including the touch screen 1000 according to the first preferred embodiment is an electronic device with a touch position detecting function of a projected capacitive system which has high sensitivity even when a transparent substrate 1026 is thick.

In this regard, the preferred embodiments of the present invention can be freely combined or optionally modified or omitted without departing from the scope of the present invention.

While the invention has been illustrated and described in detail, the foregoing description is in all aspects illustrative and not restrictive. It is therefore understood that numerous modifications and variations can be devised without departing from the scope of the invention.

What is claimed is:

1. A touch screen comprising:

a substrate which includes a main surface;

a first electrode which is disposed on said main surface and includes a plurality of first wires, said plurality of first wires [being detection wires, and each of the first wires] including a first linear portion and a plurality of first branch portions, said first linear portion extending in a first direction, said plurality of first branch portions being branched from said first linear portion;

an insulation film which is disposed on said main surface; and a second electrode which is disposed on said main surface, is *at least partially* insulated from said first electrode by said insulation film, and includes a plurality of second wires, said plurality of second wires [being excitation wires, and each of the second wires] including a second linear portion and a plurality of second branch portions, said second linear portion extending in a second direction which is not parallel to said first direction, said plurality of second branch portions being branched from said second linear portion, said second linear portion three-dimensionally intersecting said first linear portion and not three-dimensionally intersecting said plurality of first branch portions, said plurality of second branch portions each including a rim portion, *a part of* said second linear portion and said rim portion [surrounding] *forming a border that surrounds* a cavity portion [formed at each of said plurality of second branch portions, said rim portion including a portion parallel along an outline of said first linear portion or said plurality of first branch portions and not including a portion parallel along an outline of said second linear portion], *said rim portion including a first portion parallel along said first linear portion* when seen in a plan view in a normal direction of said main surface.

2. The touch screen according to claim 1, wherein said rim portion *further* includes

[a first portion, and]

a second portion which conducts with said first portion and is partitioned from said first portion by said cavity portion when seen from said plurality of first branch portions.

3. The touch screen according to claim 1, wherein each of said plurality of first branch portions includes a first extended portion extending in said second direction and having a first width, and each of said plurality of second branch portions includes a second extended portion extending in said second direction and having a second width identical to said first width.

4. The touch screen according to claim 1, wherein each of said plurality of first wires includes a first layer made of indium tin oxide, a metal wire material or an alloy wire material, and each of said plurality of second wires includes a second layer made of indium tin oxide, a metal wire material or an alloy wire material.

5. The touch screen according to claim 1, further comprising a dummy pattern which is made of an insulation body and fills said cavity portion and a gap between said first electrode and said second electrode.

6. A touch screen comprising:

a substrate which includes a main surface;

a first electrode which is disposed on said main surface and includes a plurality of first wires, said plurality of first wires [being excitation wires, and each of the first wires] including a first linear portion and a plurality of first branch portions, said first linear portion extending in a first direction, said plurality of first branch portions being branched from said first linear portion;

an insulation film which is disposed on said main surface; and a second electrode which is disposed on said main surface, is *at least partially* insulated from said first electrode by said insulation film, and includes a plurality of second wires, said plurality of second wires [being detection wires, and each of the second wires] including a second linear portion and a plurality of second branch portions, said second linear portion extending in a second direction which is not parallel to said first direction, said plurality of second branch portions being branched from said second linear portion, said second linear portion three-dimensionally intersecting said first linear portion and not three-dimensionally intersecting said plurality of first branch portions, said plurality of second branch portions each including a rim portion, *a part of* said second linear portion and said rim portion [surrounding] *forming a border that surrounds* a cavity portion [formed at each of said plurality of second branch portions], said rim portion including a *first* portion parallel along [an outline of] said first linear portion [or] *and including a second portion parallel along one of* said plurality of first branch portions and not including a portion [parallel along an outline of] *adjacent to* said second linear portion *other than the part of said second linear portion* when seen in a plan view in a normal direction of said main surface.

[7. The touch screen according to claim 6, wherein said rim portion includes a first portion, and a second portion which conducts with said first portion and is partitioned from said first portion by said cavity portion when seen from said plurality of first branch portions.]

8. The touch screen according to claim 6, wherein each of said plurality of first branch portions includes a first extended portion extending in said second direcion and having a first width, and each of said plurality of second branch portions includes a second extended portion extending in said second direction and having a second width identical to said first width.

9. The touch screen according to claim 6, wherein each of said plurality of first wires includes a first layer made of indium tin oxide, a metal wire material or an alloy wire material, and each of said plurality of second wires includes a second layer made of indium tin oxide, a metal wire material or an alloy wire material.

10. The touch screen according to claim 6, further comprising a dummy pattern which is made of an insulation body and fills said cavity portion and a gap between said first electrode and said second electrode.

*11. The touch screen according to claim 1, wherein said plurality of first wires are detection wires.*

*12. The touch screen according to claim 1, wherein said plurality of second wires are excitation wires.*

*13. The touch screen according to claim 1, wherein said rim portion does not include a portion directly adjacent to said second linear portion other than the part of said second linear portion when seen in a plan view in a normal direction of said main surface.*

*14. The touch screen according to claim 13, wherein a first branch portion of said plurality of first branch portions includes a first edge that is substantially parallel to said first linear portion.*

*15. The touch screen according to claim 14, wherein said first branch portion further includes a second edge that is substantially parallel to said second linear portion.*

*16. The touch screen according to claim 13, wherein a first branch portion of said plurality of first branch portions includes a first edge that is substantially parallel to said second linear portion.*

*17. The touch screen according to claim 1, wherein a first branch portion of said plurality of first branch portions includes a first edge that is substantially parallel to said first linear portion.*

*18. The touch screen according to claim 17, wherein said first branch portion further includes a second edge that is substantially parallel to said second linear portion.*

*19. The touch screen according to claim 1, wherein a first branch portion of said plurality of first branch portions includes a first edge that is substantially parallel to said second linear portion.*

*20. The touch screen according to claim 6, wherein a first branch portion of said plurality of first branch portions does not form a rim that has a cavity.*

*21. The touch screen according to claim 6, wherein said second linear portion is disposed between said plurality of first branch portions.*

* * * * *